(12) United States Patent
Katsuta et al.

(10) Patent No.: US 10,437,407 B2
(45) Date of Patent: Oct. 8, 2019

(54) INPUT DETECTION DEVICE

(71) Applicant: Japan Display Inc., Tokyo (JP)

(72) Inventors: Tadayoshi Katsuta, Tokyo (JP);
Hiroshi Mizuhashi, Tokyo (JP);
Hayato Kurasawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/193,810

(22) Filed: Nov. 16, 2018

(65) Prior Publication Data
US 2019/0087038 A1 Mar. 21, 2019

Related U.S. Application Data

(63) Continuation of application No. 15/679,612, filed on Aug. 17, 2017, now Pat. No. 10,156,952.

(30) Foreign Application Priority Data

Aug. 19, 2016 (JP) .................... 2016-161400

(51) Int. Cl.
| | |
|---|---|
| *G06F 3/041* | (2006.01) |
| *G06F 3/046* | (2006.01) |
| *G02F 1/1333* | (2006.01) |
| *G02F 1/1343* | (2006.01) |
| *G06F 3/0354* | (2013.01) |
| *G06F 3/047* | (2006.01) |
| *G06F 3/044* | (2006.01) |

(52) U.S. Cl.
CPC ............ *G06F 3/046* (2013.01); *G02F 1/1343* (2013.01); *G02F 1/13338* (2013.01); *G06F 3/03545* (2013.01); *G06F 3/044* (2013.01); *G06F 3/047* (2013.01); *G06F 3/0412* (2013.01); *G06F 3/0416* (2013.01)

(58) Field of Classification Search
CPC . G06F 2203/04101; G06F 2203/04108; G06F 3/03545
See application file for complete search history.

(56) References Cited

U.S. PATENT DOCUMENTS

| | | |
|---|---|---|
| 2007/0124515 A1 | 5/2007 | Ishikawa et al. |
| 2009/0225017 A1 | 9/2009 | Kim et al. |
| 2014/0160374 A1 | 6/2014 | Wang et al. |
| 2014/0354560 A1 | 12/2014 | Kim et al. |
| 2015/0049030 A1 | 2/2015 | Her |
| 2016/0202582 A1 | 7/2016 | Paek et al. |
| 2016/0378224 A1 | 12/2016 | Kwon et al. |
| 2017/0010712 A1 * | 1/2017 | Yoshizumi ............. G06F 3/044 |
| 2017/0068368 A1 | 3/2017 | Hsiao et al. |
| 2017/0192582 A1 * | 7/2017 | Pan ..................... G06F 3/0416 |
| 2017/0371440 A1 | 12/2017 | Song et al. |

FOREIGN PATENT DOCUMENTS

| | | |
|---|---|---|
| JP | H10-049301 A | 2/1998 |
| JP | 2005-352572 A | 12/2005 |

* cited by examiner

*Primary Examiner* — Sanghyuk Park
(74) *Attorney, Agent, or Firm* — K&L Gates LLP

(57) ABSTRACT

An input detection device is provided with a plurality of drive electrodes, a metal electrode opposed to the plurality of drive electrodes and having a predetermined wiring pattern, and a light-shielding film. In plan view, a width of the wiring pattern of the metal electrode overlapped with a portion of the light-shielding film with a large width is larger than a width of the wiring pattern of the metal electrode overlapped with portions other than the portion of the light-shielding film with the large width.

7 Claims, 16 Drawing Sheets

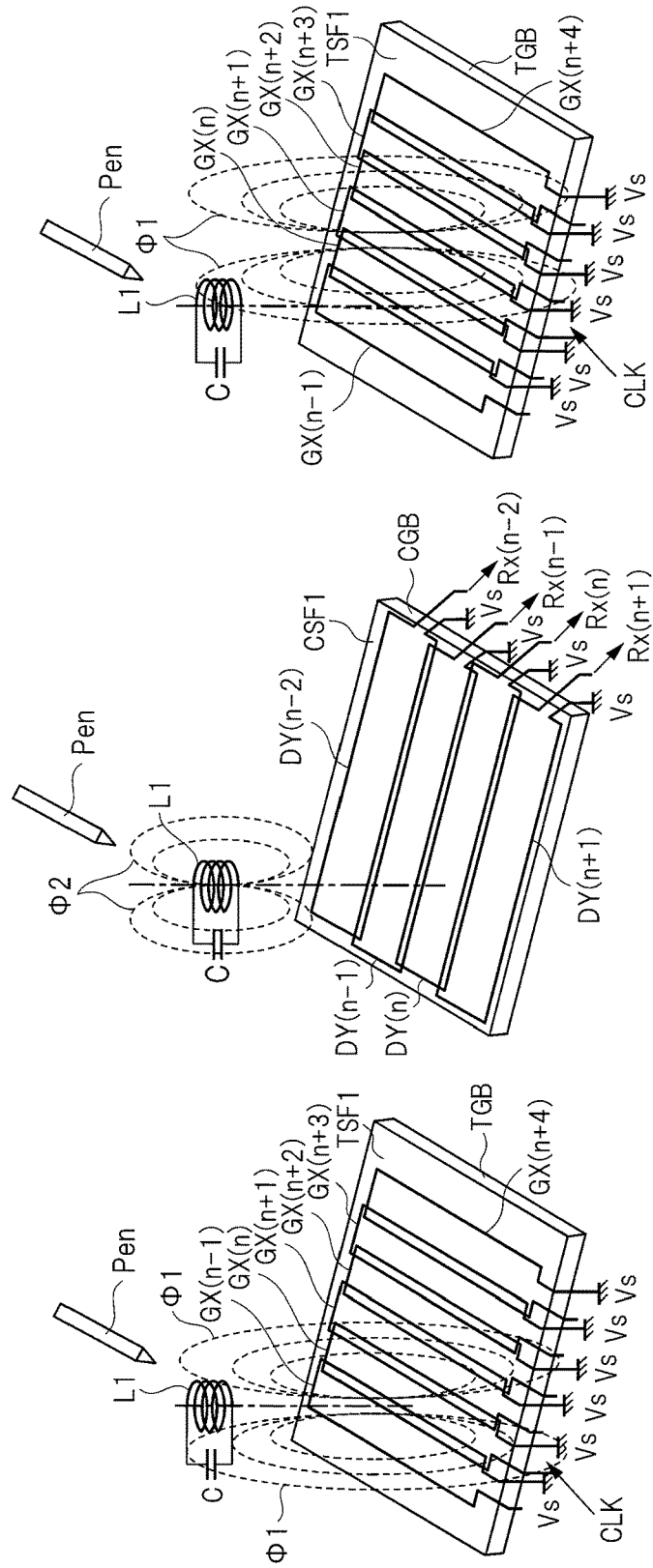

INPUT DETECTION DEVICE

CROSS-REFERENCE TO RELATED APPLICATION

The present application is a continuation of U.S. application Ser. No. 15/679,612, filed on Aug. 17, 2017, which application claims priority from Japanese Patent Application No. 2016-161400, filed on Aug. 19, 2016, the contents of which is hereby incorporated by reference.

TECHNICAL FIELD OF THE INVENTION

The present invention relates to an input detection device and an electronic device, and particularly, relates to an input detection device and an electronic device having a touch detection function capable of detecting proximity of an external object.

BACKGROUND OF THE INVENTION

Recently, as an input detection device, an input detection device having a touch detection function capable of detecting proximity (hereinafter, including contact) of an external object, so-called a touch panel, has drawn attention. The touch panel is mounted on a display device such as a liquid-crystal display device or integrated with a liquid-crystal display device and is provided as a display device with a touch detection function.

There is a touch panel which enables use of a pen, for example, as the external object. By using the pen, for example, a small region can be designated, and handwritten characters can be input. There are various techniques for detecting touch by the pen. One of the various techniques is an electromagnetic induction method. In the electromagnetic induction method, since it is possible to realize high accuracy and high pen-pressure detection accuracy and to also realize a hovering detection function of detecting a hovering state in which the external object is spaced apart from the front surface of the touch panel, the electromagnetic induction method is an effective technique as a technique to detect touch by the pen.

Also, there is a touch detection device capable of detecting a finger or the like as the external object. In this case, since the detection target is different from the pen, a method different from the electromagnetic induction method is employed as a technique to detect touch. For example, there is a method in which an optical change, a resistance value change, or an electric field change generated by touch of a finger or the like is detected. Among these methods, the method of detecting an electric field change includes, for example, a capacitive sensing method using an electrostatic capacitance, for example. Since the capacitive sensing method has a comparatively simple structure and low power consumption, it is used in PDA (personal digital assistance), etc.

A technique related to a touch panel of the electromagnetic induction method is described in Japanese Patent Application Laid-Open Publication No. H10-49301 (Patent Document 1), for example.

SUMMARY OF THE INVENTION

In a case of the touch panel of the electromagnetic induction method, in order to reduce a resistance value of a drive electrode and increase a current amount, it is effective to arrange a metal electrode opposed to the drive electrode. The reason is that reduction in resistance is required for the touch panel of the electromagnetic induction method rather than that of the capacitive sensing method.

In this case, a region in which the metal electrode is arranged is limited to an inner side of a light-shielding film. In view of this, the present inventors have studied arrangement of the metal electrode capable of reducing resistance of the drive electrode, in consideration of arrangement relation of the metal electrode and the light-shielding film.

Patent Document 1 describes a technique related to a touch panel of the electromagnetic induction method, but neither describes nor recognizes resistance reduction of the drive electrode by the arrangement relation between the metal electrode and the light-shielding film.

It is an object of the present invention to provide an input detection device capable of reducing resistance of the drive electrode by the arrangement relation between the metal electrode and the light-shielding film.

An input detection device according to one aspect of the present invention includes: a plurality of drive electrodes; a metal electrode opposed to the plurality of drive electrodes and having a predetermined wiring pattern; and a light-shielding film. In this input detection device, in plan view, a width of the wiring pattern of the metal electrode overlapped with a portion of the light-shielding film with a large width is larger than a width of the wiring pattern of the metal electrode overlapped with portions other than the portion of the light-shielding film with the large width.

BRIEF DESCRIPTION OF THE DRAWINGS

FIG. 2A is an explanatory view illustrating a principle of a magnetic field detection;

FIG. 2B is an explanatory view illustrating the principle of the magnetic field detection;

FIG. 2C is an explanatory view illustrating the principle of the magnetic field detection;

DESCRIPTIONS OF THE PREFERRED EMBODIMENTS

Figure 1A:
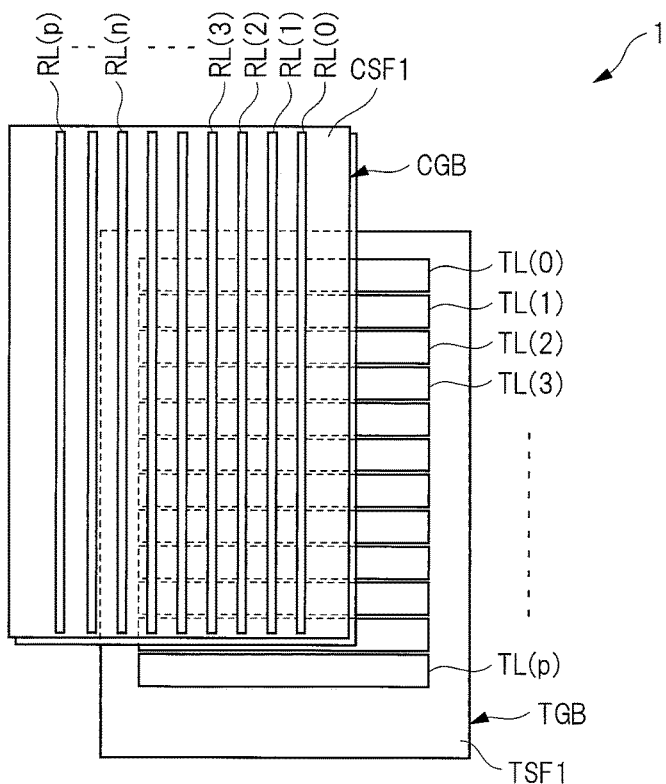
FIG. 1A is a plan view schematically illustrating a configuration of a display device.

Hereinafter, embodiments of the present invention will be described in detail with reference to the accompanying drawings. Note that this disclosure is an example only and suitable modifications which can be easily conceived by those skilled in the art without departing from the gist of the present invention are included within the scope of the invention as a matter of course. In addition, in order to further clarify the description, a width, a thickness, a shape, and the like of respective portions may be more schematically illustrated in the drawings than those in an actual state, but they are examples only and do not limit the interpretation of the present invention.

In addition, in this specification and the respective drawings, the same components described in the drawings which have been described before are denoted by the same reference characters, and detailed description thereof may be omitted as needed. In the following description, a liquid-crystal display device with a touch detection function will be described as an example of an input detection device, but the input detection device is not limited thereto. For example, the input detection device may be an OLED display device with a touch detection function or may be a touch panel or the like not having a display function.

First Embodiment

In a first embodiment, a liquid-crystal display device with a touch detection function (hereinafter, also referred to as a display device) capable of detecting both touch by a pen and touch by a finger is provided. First, a basic configuration of the display device will be described. Next, based on the basic configuration, principles of magnetic field detection of detecting touch by a pen (hereinafter, also referred to as magnetic field touch detection or magnetic field touch detection by an electromagnetic induction method) and electric field detection of detecting touch by a finger (hereinafter, also referred to as electric field touch detection or electric field touch detection by an capacitive sensing method) will be described.

Basic Configuration of Display Device

Figure 1B:
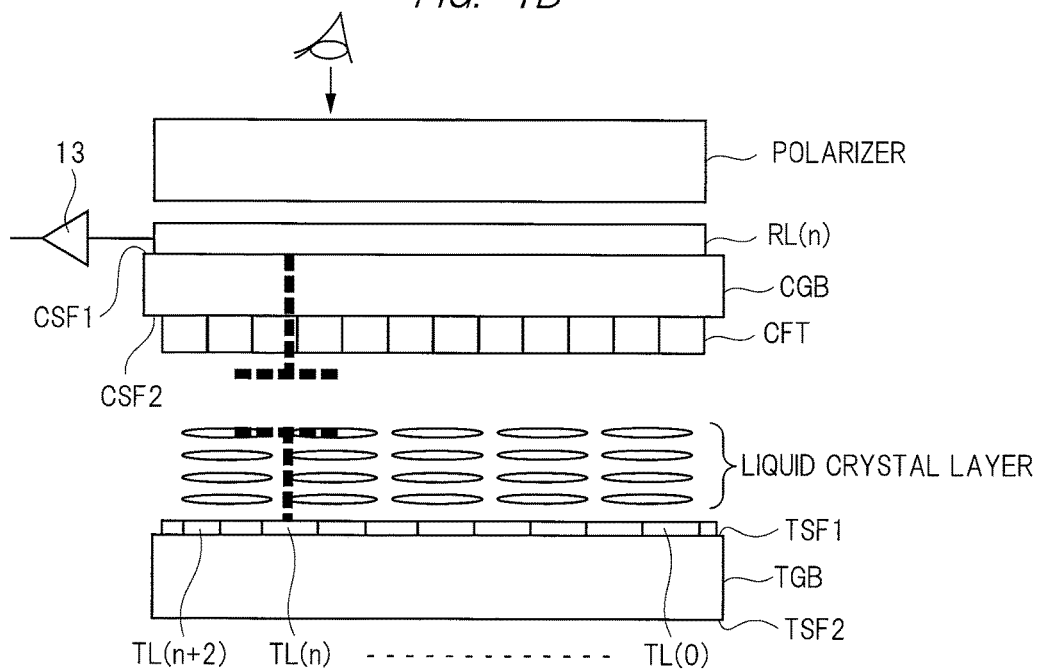
FIG. 1B is a cross-sectional view schematically illustrating the configuration of the display device.

FIG. 1A is a plan view schematically illustrating a configuration of a display device. FIG. 1B is a cross-sectional view schematically illustrating the configuration of the display device. In FIGS. 1A and 1B, reference numeral 1 denotes a display device, FIG. 1A is a plan view illustrating a plane of the display device 1, and FIG. 1B is a cross-sectional view illustrating a cross section of the display device 1. The display device 1 is provided with a TFT (Thin Film Transistor) glass substrate (hereinafter, also referred to as an insulating first substrate or, simply, a first substrate) TGB, a layer layered over the first substrate TGB, a color filter CFT, a CF (Color Filter) glass substrate (hereinafter, also referred to as an insulating second substrate or, simply, a second substrate) CGB, and a layer layered over the second substrate CGB.

In FIG. 1A, reference characters TL(0) to TL(p) denote drive electrodes constituted by the layer formed over a first main surface TSF1 of the first substrate TGB. Reference characters "RL(0)" to "RL(p)" denote detection electrodes constituted by the layer formed over a first main surface CSF1 of the second substrate CGB. In order to facilitate understanding, in FIG. 1A, the first substrate TGB and the second substrate CGB are illustrated in a manner that the substrates are separated from each other. However, in practice, as illustrated in FIG. 1B, the first substrate TGB and the second substrate CGB are arranged in such a way that the first main surface TSF1 of the first substrate TGB and a second main surface CSF2 of the second substrate CGB are opposed to each other across a liquid crystal layer.

The plurality of layers, the liquid crystal layer, and the like are interposed between the first main surface TSF1 of the first substrate TGB and the second main surface CSF2 of the second substrate CGB. However, FIG. 1B illustrates only the drive electrodes TL(0) to TL(n+2) interposed between the first main surface TSF1 and the second main surface CSF2, the liquid crystal layer, and the color filter CFT. In addition, the plurality of detection electrodes RL(0) to RL(p) and a polarizer are arranged over the first main surface CSF1 of the second substrate CGB as illustrated in FIG. 1A. Moreover, in FIG. 1B, reference numeral 13 denotes a unit detection circuit connected to the detection electrode RL(n).

In the present specification, a description will be given assuming that, as illustrated in FIG. 1B, a state of the display device 1 viewed from a side of the first main surface CSF1 of the second substrate CGB and the first main surface TSF1 of the first substrate TGB is a plan view. When viewed in plan view from the side of the first main surface CSF1 and the first main surface TSF1, the drive electrodes TL(0) to TL(p) extend in a row direction (lateral direction) and are arranged in parallel to each other in a column direction (longitudinal direction) on the first main surface TSF1 of the first substrate TGB as illustrated in FIG. 1A. In addition, the detection electrodes RL(0) to RL(p) extend in the column direction (longitudinal direction) and are arranged in parallel to each other in the row direction (lateral direction) on the first main surface CSF1 of the second substrate CGB as illustrated in FIG. 1A.

The second substrate CGB, the liquid crystal layer, and the like are interposed between the drive electrodes TL(0) to TL(p) and the detection electrodes RL(0) to RL(p). Therefore, the drive electrodes TL(0) to TL(p) and the detection electrodes RL(0) to RL(p) intersect with each other in plan view, but are electrically separated from each other. There is a capacitance between the drive electrode and the detection electrode. In FIG. 1B, the capacitance is illustrated as a capacitive element by dashed lines.

It is preferable that the drive electrodes TL(0) to TL(p) and the detection electrodes RL(0) to RL(p) are orthogonal to each other in plan view; however, in plan view, the drive electrodes and the detection electrodes may intersect with each other at an angle other than the right angle. Therefore, "orthogonal" used in the description below should be construed to also include "intersection."

Principle of Magnetic Field Detection

FIG. 2A is an explanatory view illustrating a principle of a magnetic field detection. FIG. 2B is an explanatory view illustrating the principle of the magnetic field detection. FIG. 2C is an explanatory view illustrating the principle of the magnetic field detection. A period of magnetic field detection is configured of a magnetic field generation period in which a magnetic field is generated and a magnetic field detection period in which the magnetic field is detected. FIGS. 2A and 2C each illustrate an operation in the magnetic field generation period, and FIG. 2B illustrates an operation in the magnetic field detection period. For the sake of convenience of description, FIGS. 2A to 2C each illustrate a state in which FIG. 1A is rotated by 90 degrees.

During the magnetic field generation period, ends of predetermined drive electrodes among the drive electrodes TL(0) to TL(p) are electrically connected, and a predetermined voltage (for example, a ground voltage Vs) and a magnetic field drive signal are supplied to the drive electrodes whose ends are connected. For example, among one end and the other end of each of the drive electrodes TL(0) and TL(2) illustrated in FIG. 1A, the other end of each of the drive electrodes TL(0) and TL(2) on the right side in FIG. 1A is electrically connected. Thus, the drive electrodes TL(0) and TL(2) arranged in parallel to each other are connected in series. The ground voltage Vs is supplied to the one end of the drive electrode TL(0) on the left side in FIG. 1A, and the magnetic field drive signal is supplied to the one end of the drive electrode TL(2) on the left side in FIG. 1A. Here, the magnetic field drive signal is a signal whose voltage periodically changes. The drive electrodes TL(0) and TL(2) constitute a magnetic field generation coil where a region interposed (a region formed) by the drive electrodes is located inside the coil. The magnetic field generation coil generates a magnetic field corresponding to a change in voltage of the magnetic field drive signal inside the coil.

In FIG. 2A, reference character GX(n−1) denotes the magnetic field generation coil constituted by the drive electrodes TL(0) and TL(2). Similarly to the magnetic field generation coil GX(n−1), reference characters GX(n) to GX(n+4) denote magnetic field generation coils constituted by the drive electrodes TL(1) and TL(3) to TL(p).

In FIG. 2A, reference characters C and L1 denote a capacitive element and a coil incorporated in a pen Pen, respectively. The capacitive element C and the coil L1 are connected in parallel such that the capacitive element and the coil constitute a resonance circuit. In the magnetic field generation period, the ground voltage Vs is supplied to one end of each of the magnetic field generation coils GX(n−1) to GX(n+3). A magnetic field drive signal CLK is supplied to the other end of the magnetic field generation coil GX(n). Therefore, the magnetic field generation coil GX(n) generates a magnetic field φ1 corresponding to a change in voltage of the magnetic field drive signal CLK. When the pen Pen is in proximity to the magnetic field generation coil GX(n), the magnetic field generation coil GX(n) and the coil L1 are electromagnetically coupled, the magnetic field φ1 causes an induced voltage due to mutual induction to be generated in the coil L1, and the capacitive element C is charged.

Next, the magnetic field generation period transitions to the magnetic field detection period illustrated in FIG. 2B. In the magnetic field detection period, a magnetic field is detected by using the detection electrodes RL(0) to RL(p). Each of the detection electrodes RL(0) to RL(p) includes a pair of ends. Among one ends and the other ends of the detection electrodes RL(0) to RL(p), the other ends of predetermined detection electrodes are electrically connected to each other. For example, the other ends of the detection electrodes RL(0) and RL(3) illustrated in FIG. 1A are electrically connected to each other on the upper side in FIG. 1A. Therefore, the detection electrodes RL(0) and RL(3) arranged in parallel to each other are connected in series. In the magnetic field detection period, a predetermined voltage Vs is supplied to the one end of the detection electrode RL(3), and the one end of the detection electrode RL(0) is connected to the unit detection circuit. Thus, a magnetic field detection coil is formed, and a region interposed (a region formed) by the detection electrodes RL(0) and RL(3) is located inside the coil. The magnetic field detection coil detects a magnetic field generated by the pen Pen.

In FIG. 2B, reference character DY(n−2) denotes a magnetic field detection coil constituted by the detection electrodes RL(0) and RL(3). Similarly, reference characters DY(n−1) to DY(n+1) denote magnetic field detection coils constituted by the detection electrodes RL(2) to RL(p). In the magnetic field detection period, the predetermined voltage Vs is supplied to one end of each of the magnetic field detection coils DY(n−2) to DY(n+1). Signals Rx(n−2) to Rx(n+1) from the respective other ends of the magnetic field detection coils DY(n−2) to DY(n+1) are supplied to the unit detection circuits.

If the capacitive element C is charged in the magnetic field generation period, the coil L1 generates a magnetic field φ2 which changes according to a resonance frequency of the resonance circuit depending on electric charges charged in the capacitive element C in the magnetic field detection period. In FIG. 2B, the center (alternate long and short dash line) of the coil L1 is present inside the magnetic field detection coil DY(n). Therefore, the magnetic field detection coil DY(n) and the coil L1 are electromagnetically coupled to each other, and an induced voltage is generated in the magnetic field detection coil DY(n) due to mutual induction. As a result, the signal Rx(n) from the other end of the magnetic field detection coil DY(n) changes according to a charge quantity charged in the capacitive element C. The unit detection circuit connected to the magnetic field detection coil DY(n) outputs the change in the signal Rx(n) as a detection signal. Accordingly, it is possible to detect whether the pen Pen is in proximity (touches) and to extract the coordinates of the pen. In addition, since the detection signal changes according to the charge quantity, it is possible to determine a distance to the pen Pen.

FIG. 2C illustrates the magnetic field generation period subsequent to the state illustrated in FIG. 2B. FIG. 2C is different from FIG. 2A in that the magnetic field drive signal CLK is supplied to the magnetic field generation coil GX(n+1). Since the position of the pen Pen is not changed, in the magnetic field generation period illustrated in FIG. 2C, an induced voltage is not generated in the coil L1, and the capacitive element C is not charged. Therefore, in the magnetic field detection period subsequent to the state illustrated in FIG. 2C, proximity of the pen Pen is not detected. Subsequently, in a similar manner, detection of the pen Pen is performed.

Principles of Electric Field Detection

Figure 3A:
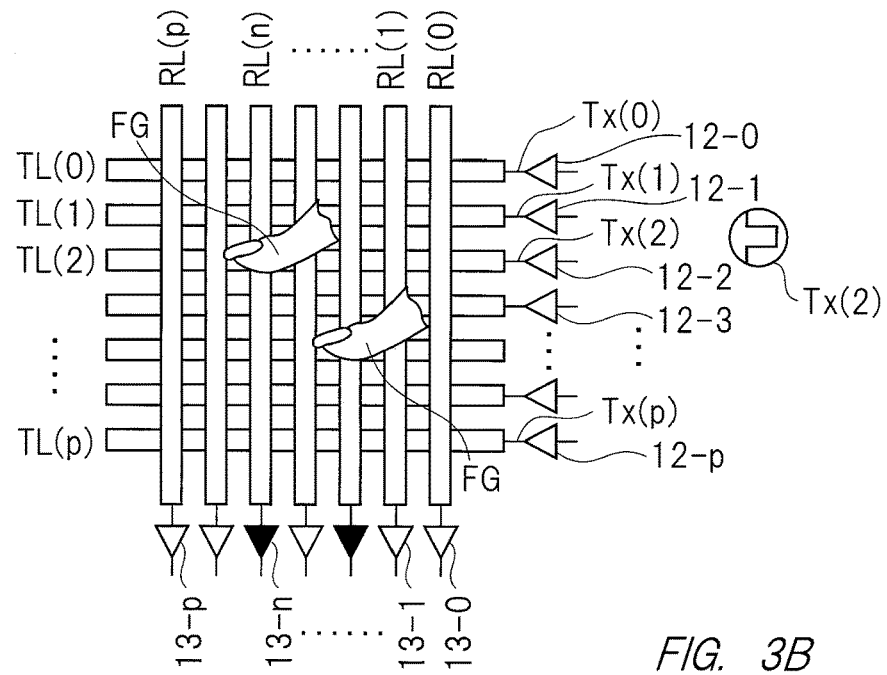
FIG. 3A is an explanatory view illustrating a principle of an electric field detection.
Figure 3B:
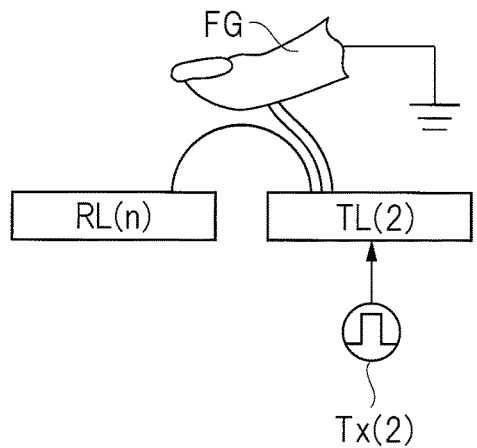
FIG. 3B is an explanatory view illustrating the principle of the electric field detection.
Figure 3C:
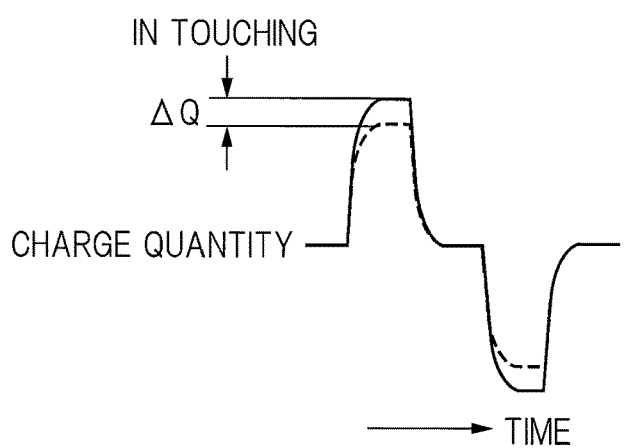
FIG. 3C is a graph illustrating the principle of the electric field detection.

FIG. 3A is an explanatory view illustrating a principle of an electric field detection. FIG. 3B is an explanatory view illustrating the principle of the electric field detection. FIG. 3C is a graph illustrating the principle of the electric field detection. In FIG. 3A, each of reference characters 12-0 to 12-p denotes a unit drive circuit outputting an electric field drive signal, and each of reference characters 13-0 to 13-p denotes the unit detection circuit. In addition, in FIG. 3A, a pulse signal encircled by a solid line represents a waveform of an electric field drive signal Tx(2) supplied to the drive electrode TL(2). Reference character FG denotes a finger as an external object.

When the electric field drive signal Tx(2) is supplied to the drive electrode TL(2), an electric field is generated between the drive electrode TL(2) and the detection electrode RL(n) orthogonal to the drive electrode TL(2) as illustrated in FIG. 3B. At this time, when the finger FG touches the vicinity of the drive electrode TL(2), an electric field is also generated between the finger FG and the drive electrode TL(2), and the electric field generated between the drive electrode TL(2) and the detection electrode RL(n) reduces. Accordingly, a charge quantity between the drive electrode TL(2) and the detection electrode RL(n) reduces. As a result, as illustrated in FIG. 3C, the charge quantity generated in response to supply of the drive signal Tx(2) when the finger FG touches the vicinity is smaller by ΔQ than that when the finger FG does not touch the vicinity. The difference in charge quantity leads to a difference in voltage, and the difference in voltage is supplied to the unit detection circuit 13-n and is output as a detection signal.

Similarly, by supplying an electric field drive signal to each of the other drive electrodes, a change in voltage of the signal depending on whether or not the finger FG touches the vicinity of the drive electrode is generated in one of the detection electrodes RL(0) to RL(p), and the change in voltage is output as a detection signal. Thus, it is possible to detect whether or not the finger FG touches and to extract the coordinates of the finger.

As described above, in magnetic field detection, a magnetic field drive signal is supplied to a drive electrode selected from among the drive electrodes TL(0) to TL(p), and in electric field detection, an electric field drive signal is supplied to the selected drive electrode. Meanwhile, in displaying, a display drive signal is supplied to each of the drive electrodes TL(0) to TL(p). Since the display drive signal causes the drive electrodes TL(0) to TL(p) to have the same voltage, the drive electrodes TL(0) to TL(p) can be considered as one common electrode.

Overall Configuration of Display Device

Figure 4:
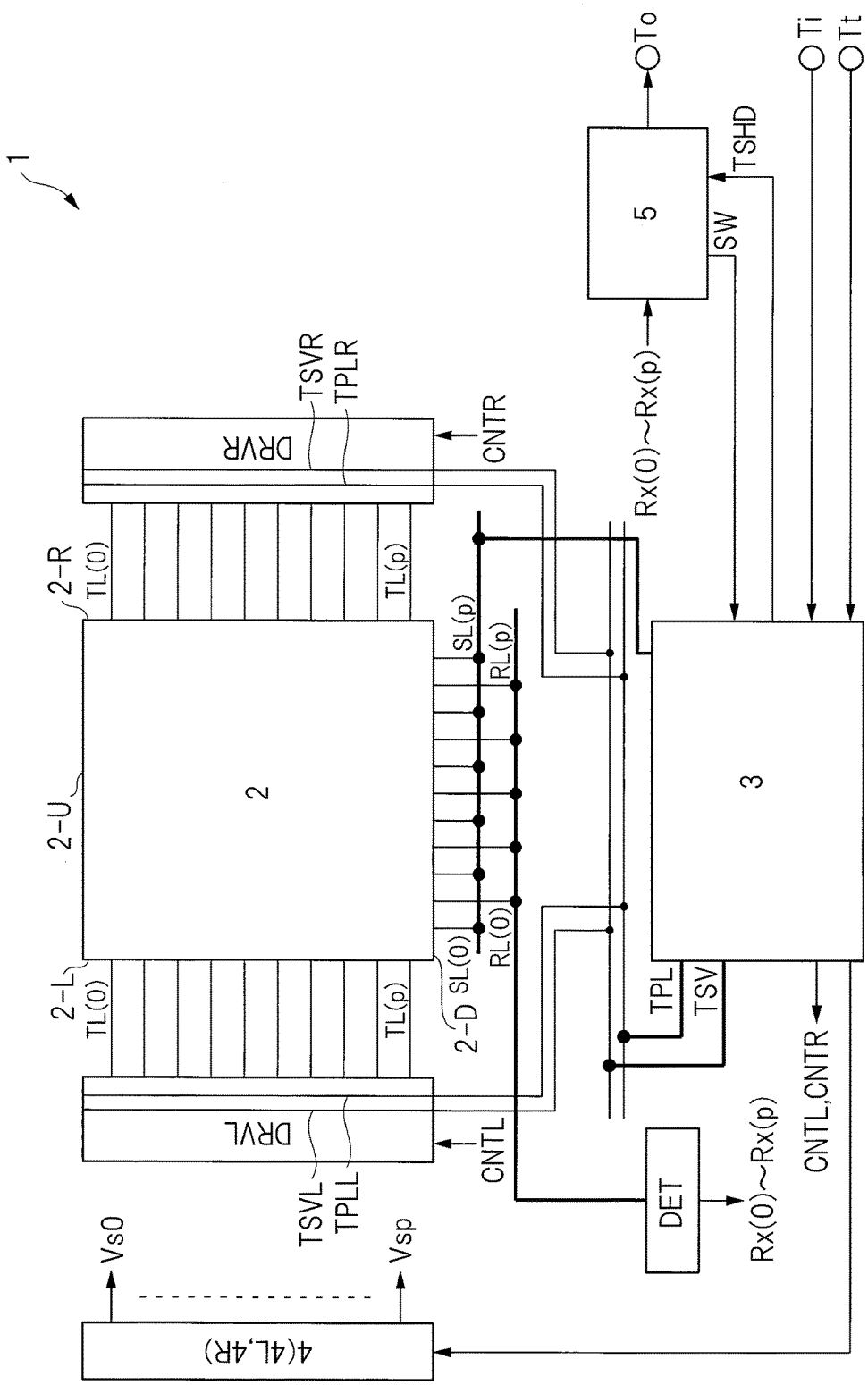
FIG. 4 is a block diagram illustrating a configuration of a display device according to a first embodiment.

FIG. 4 is a block diagram illustrating a configuration of a display device according to a first embodiment. In FIG. 4, the display device 1 includes a display panel (liquid crystal panel), a control device 3, a gate driver 4 (gate drivers 4L and 4R), and a touch control device 5. In addition, the display device 1 further includes drive circuits DRVL and DRVR and a detection circuit DET. The display panel includes a display region where display is performed, and a frame region in the periphery of the display region. In terms of display, the display region is an active region, and the frame region surrounding the display region is a non-active region. In FIG. 4, reference numeral 2 denotes the display region. In addition, the display region 2 is a detection region of magnetic field touch detection by the electromagnetic induction method and of electric field touch detection by the capacitive sensing method.

The display region 2 includes a pixel array where a plurality of pixels are arranged in a matrix. In the pixel array, a plurality of signal lines, the plurality of drive electrodes, a plurality of scan lines, and the plurality of detection electrodes are arranged. With reference to FIG. 4, in the pixel array, the signal lines SL(0) to SL(p) extend in the longitudinal direction (column direction) and are arranged in parallel to one another in the lateral direction (row direction). In addition, the drive electrodes TL(0) to TL(p) extend in the lateral direction and are arranged in parallel to one another in the longitudinal direction. Further, the scan lines extend in the lateral direction and are arranged in parallel to one another in the longitudinal direction. The detection electrodes RL(0) to RL(p) extend in the longitudinal direction and are arranged in parallel to one another in the lateral direction. In this case, the pixels are arranged in spaces formed by the plurality of signal lines and the plurality of scan lines intersecting with each other. In a period for display (display period), a pixel is selected by the signal line and the scan line, a voltage of the signal line and a voltage of the drive electrode at this time are applied to the selected pixel, and display according to the difference in voltage between the signal line and the drive electrode is performed.

The control device 3 receives a timing signal supplied to an external terminal Tt and image information supplied to an input terminal Ti, generates an image signal according to the image information in the display period, and supplies the image signal to the plurality of signal lines SL(0) to SL(p). In addition, the control device 3 receives the timing signal supplied to the external terminal Tt and a control signal SW supplied from the touch control device 5, and generates various signals. In FIG. 4, only signals necessary for the description are depicted as representatives among the signals generated by the control device 3. That is, the control device 3 generates a synchronization signal TSHD and control signals CNTL and CNTR. Although there is no particular limitation, the control device 3 generates drive signals TPL and TSV (that is, the control device 3 functions as a supply source).

The synchronization signal TSHD is a synchronization signal for discriminating the display period in which display is performed in the display region 2 and a touch detection period in which touch detection is performed in the display region 2. The control device 3 controls such that the touch control device 5 operates in the touch detection period by the synchronization signal TSHD.

In displaying, the gate driver 4 generates scan line signals Vs0 to Vsp according to a timing signal from the control device 3 and supplies the scan line signals Vs0 to Vsp to the scan lines in the display region 2. In the display period, pixels connected to a scan line to which a high-level scan line signal is supplied are selected, and the selected pixels perform display according to image signals supplied to the signal lines SL(0) to SL(p) at this time.

In magnetic field touch detection by the electromagnetic induction method or electric field touch detection by the capacitive sensing method, the detection circuit DET detects changes in signal in the detection electrodes RL(0) to RL(p) and outputs detection signals Rx(0) to Rx(p).

The touch control device 5 receives the detection signals Rx(0) to Rx(p), extracts the coordinates of the touched location, and outputs the coordinates from an external terminal To. In addition, the touch control device 5 outputs the control signal SW, and the touch control device 5 receives the synchronization signal TSHD and operates in synchronization with the control device 3.

The display region 2 has sides 2-U and 2-D parallel to the row of the pixel array, and sides 2-R and 2-L parallel to the column of the pixel array. Here, the side 2-U and the side 2-D face each other, and the plurality of drive electrodes TL(0) to TL(p) and the plurality of scan lines in the pixel array are arranged between the two sides. In addition, the side 2-R and the side 2-L face each other, and the plurality of signal lines SL(0) to SL(p) and the plurality of detection electrodes RL(0) to RL(p) in the pixel array are arranged between the two sides.

The drive circuit DRVL is arranged along the side 2-L of the display region 2 and is connected to the one end of each of the drive electrodes TL(0) to TL(p). Similarly, the drive circuit DRVR is arranged along the side 2-R of the display region 2 and is connected to the other end of each of the drive electrodes TL(0) to TL(p).

In magnetic field touch detection, the drive circuits DRVL and DRVR each select a desired drive electrode from among the drive electrodes TL(0) to TL(p) and supply a magnetic field drive signal to the selected drive electrode. Also in electric field touch detection, the drive circuits DRVL and DRVR select a desired drive electrode and supply an electric field drive signal to the selected drive electrode.

In FIG. 4, reference characters TPLL, TPLR, TSVL, and TSVR each denote a signal wire. The signal wires TPLL and TSVL extend along the side 2-L of the display region 2. Similarly, the signal wires TPLR and TSVR extend along the side 2-R of the display region 2.

In the magnetic field touch detection and the electric field touch detection, the drive circuit DRVL connects the selected drive electrode to the signal wire TPLL or TSVL. Similarly, in the magnetic field touch detection and the electric field touch detection, the drive circuit DRVR connects the selected drive electrode to the signal wires TPLR or TSVR.

The drive signals TPL and TSV generated by the control device 3 are supplied to ends of the signal wires TPLL and TPLR and the signal wires TSVL and TSVR, respectively. In the magnetic field touch detection, the drive signals TPL and TSV propagating through the signal wires TPLL and TPLR, and the signal wires TSVL and TSVR, respectively, are supplied to the selected drive electrode, and a magnetic field is generated. Also, in the electric field touch detection, the drive signals TPL and TSV propagating through the signal wires TPLL and TPLR, and the signal wires TSVL and TSVR, respectively, are supplied to the selected drive electrode, and an electric field is generated.

Module Configuration of Display Device

Figure 5:
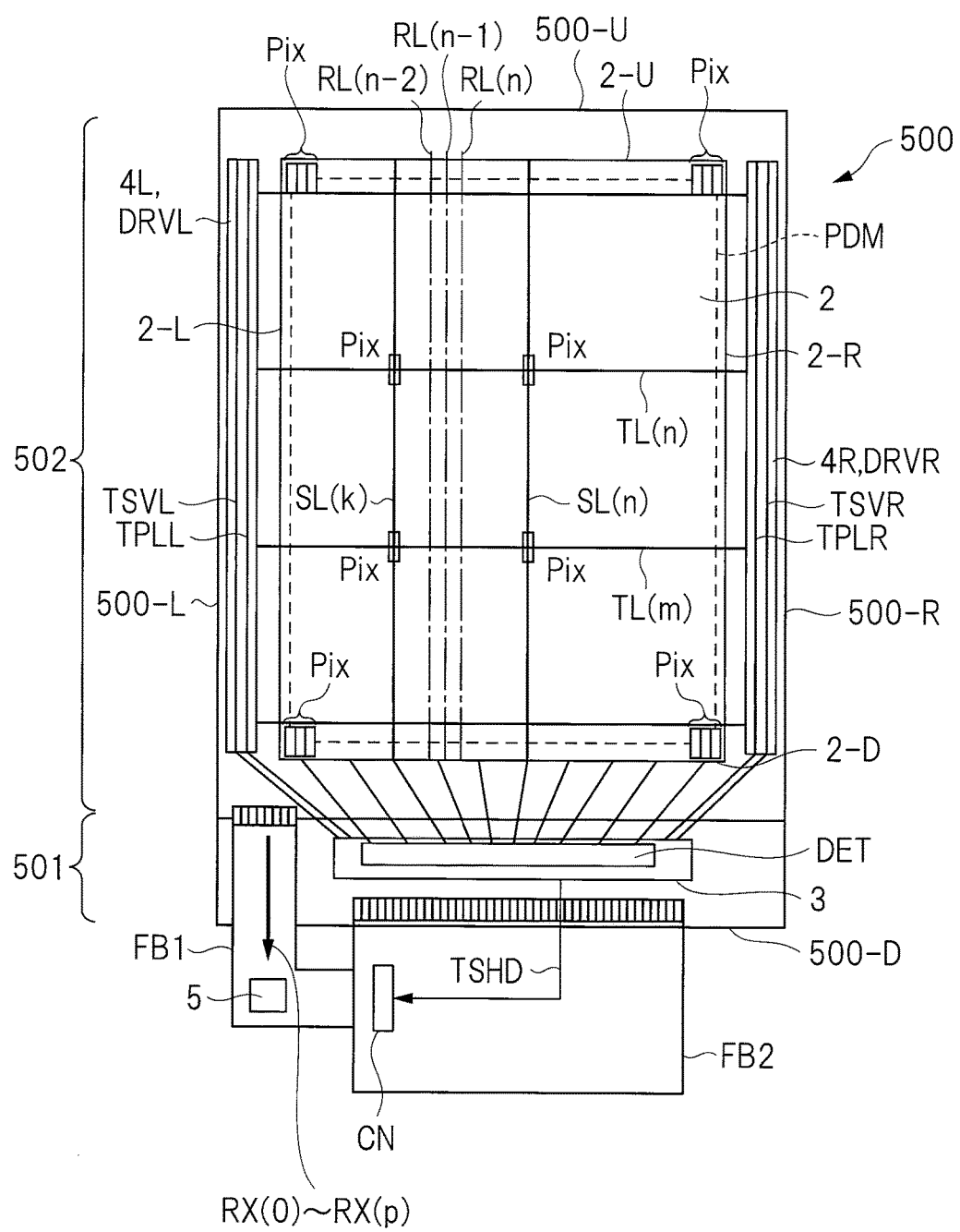
FIG. 5 is a plan view illustrating a configuration of a module according to the first embodiment.

FIG. 5 is a schematic plan view illustrating an overall configuration of a module 500 mounted with the display device 1 according to the first embodiment. FIG. 5 schematically depicts the actual arrangement. In FIG. 5, reference numeral 501 denotes a region of the first substrate TGB illustrated in FIGS. 1A and 1B, and reference numeral 502 denotes a region where the first substrate TGB and the second substrate CGB are layered. In the module 500, the first substrate TGB in the region 501 and the first substrate TGB in the region 502 are integrated. In addition, in the region 502, the second substrate CGB is mounted over the first substrate TGB such that the first main surface TSF1 of the first substrate TGB faces the second main surface CSF2 of the second substrate CGB. In addition, in FIG. 5, reference characters 500-U and 500-D denote short sides of the module 500, and reference characters 500-L and 500-R denote long sides of the module 500.

The gate driver 4L and the drive circuit DRVL illustrated in FIG. 4 are arranged in a left side frame region between the side 2-L of the display region 2 and the side 500-L of the module 500, in the region 502. The gate driver 4R and the drive circuit DRVR illustrated in FIG. 4 are arranged in a right side frame region between the side 2-R of the display region 2 and the side 500-R of the module 500. The detection circuit DET and the control device 3 illustrated in FIG. 4 are arranged in a lower side frame region between the side 2-D of the display region 2 and the side 500-D of the module 500. The detection circuit DET is constituted by a wire and a component formed on the first main surface TSF1 of the first substrate TGB in the region 501. The control device 3 is mounted on the first substrate TGB such that the control device 3 covers the detection circuit DET in plan view. In addition, wires and components constituting the drive circuits DRVL and DRVR are also formed on the first main surface TSF1 of the first substrate TGB, in the region 502.

The detection signals Rx(0) to Rx(p) described with reference to FIG. 4 are supplied to the touch control device 5 via a wire in a flexible cable FB1. A flexible cable FB2 is connected to the region 501. The touch control device 5 transmits and receives a signal to and from the control device 3 via a connector CN provided at the flexible cable FB2.

As described above, the display region 2 includes the pixel array where the plurality of pixels are arrayed in a matrix. The display region 2 includes the plurality of drive electrodes TL(0) to TL(p) and the plurality of scan lines arranged along the row of the pixel array, and the plurality of signal lines SL(0) to SL(p) and the plurality of detection electrodes RL(0) to RL(p) arranged along the column of the array. FIG. 5 illustrates two drive electrodes TL(n) and TL(m), two signal lines SL(k) and SL(n), and three detection electrodes RL(n−2) to RL(n) by way of example. Note that the scan lines are omitted in FIG. 5; however, the scan lines extend in parallel to the drive electrodes TL(n) and TL(m) illustrated as examples.

In addition, in FIG. 5, the pixel array is depicted by a dashed line PDM. Reference character Pix denotes each of the pixels arranged at four corners of the display region 2 and the pixels arranged at the intersections of the drive electrodes and the signal lines illustrated as examples among the plurality of pixels arranged in the pixel array PDM.

Pixel Array of Display Region

Figure 6:
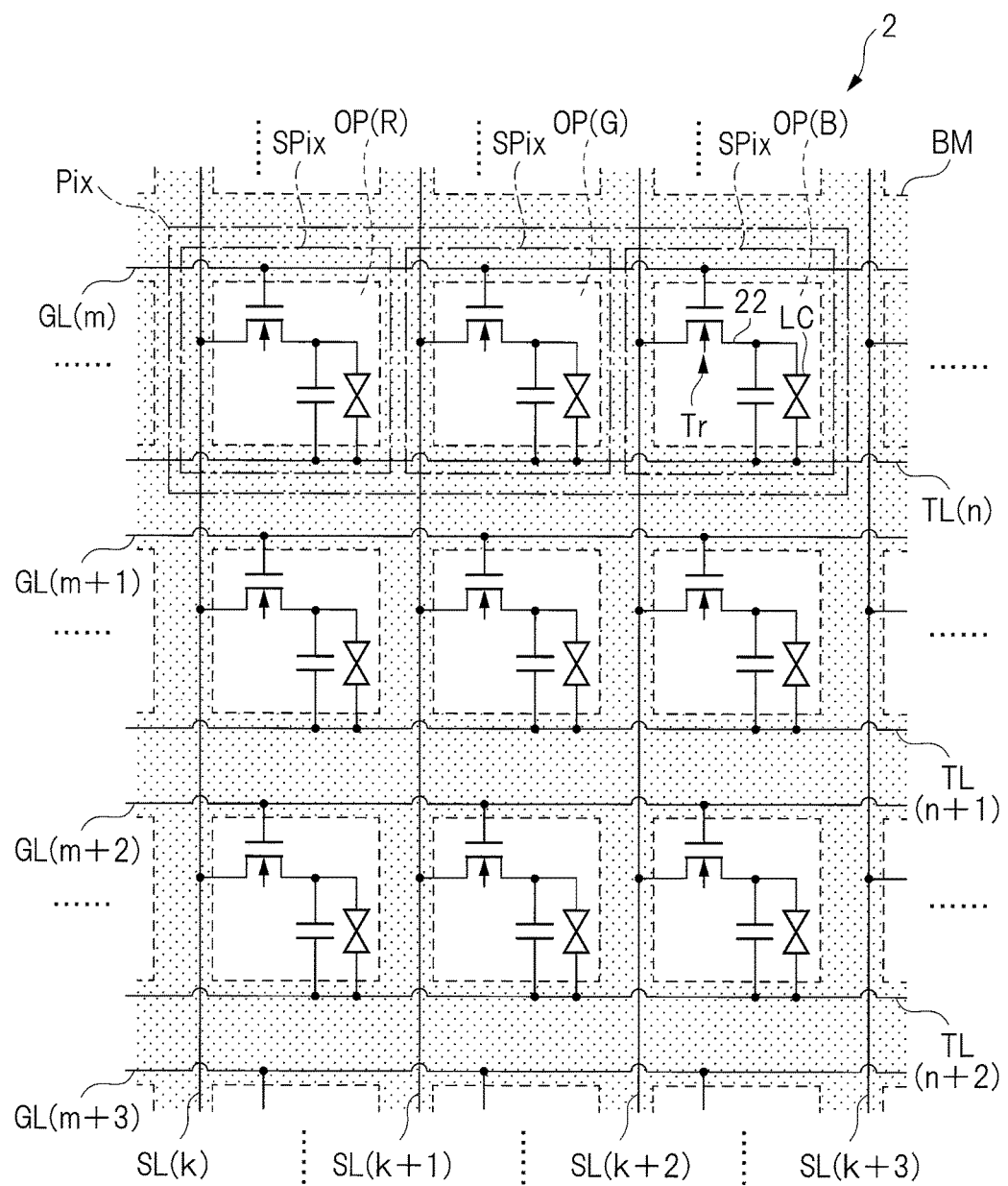
FIG. 6 is a circuit diagram illustrating a pixel array of a display region according to the first embodiment.

FIG. 6 is a circuit diagram illustrating a pixel array of the display region according to the first embodiment. As illustrated in FIG. 6, the display region 2 has the pixel array in which the plurality of pixels Pix are disposed in a matrix (row-column configuration). Each of the pixels Pix corresponds to one set of pixels including three sub-pixels SPix, for example, red, green, and blue. In the pixel array, the plurality of signal lines, the plurality of scan lines, and the plurality of drive electrodes are disposed. The sub-pixels SPix are disposed in the spaces which are formed by intersections with the plurality of signal lines and the plurality of scan lines.

In FIG. 6, as examples, part of a plurality of signal lines SL(k) to SL(k+3), a plurality of scan lines GL(m) to GL(m+3), and a plurality of drive electrodes TL(n) to TL(n+2) is illustrated. The plurality of signal lines SL(k) to SL(k+3) extend in the column direction and are disposed in parallel in the row direction. The plurality of scan lines GL(m) to GL(m+3) extend in the row direction and are disposed in parallel in the column direction. The plurality of drive electrodes TL(n) to TL(n+2) extend in the row direction and are disposed in parallel in the column direction. The sub-pixels SPix are disposed in the spaces which are formed by intersections of the plurality of signal lines SL(k) to SL(k+3) and the plurality of scan lines GL(m) to GL(m+3).

The sub-pixel SPix is provided with a thin-film transistor (TFT; Thin Film Transistor) element Tr, a liquid crystal element LC, and a retention capacity C. The TFT element Tr is formed of a thin-film transistor and, in this example, is formed of an n-channel MOS Metal Oxide Semiconductor)-type TFT. Sources of the TFT elements Tr are connected to the signal lines SL(k) to SL(k+3), gates thereof are connected to the scan lines GL(m) to GL(m+3), and drains thereof are connected to first ends of the liquid crystal elements LC. The first ends of the liquid crystal elements LC are connected to the drains of the TFT elements Tr, and second ends thereof are connected to the drive electrodes TL(n) to TL(n+2). First ends of the retention capacities C are connected to the drains of the TFT elements Tr, and second ends thereof are connected to the drive electrodes TL(n) to TL(n+2).

In the display device 1 according to the first embodiment, the gate driver 4 illustrated in FIG. 4 is driven so as to sequentially scan the scan lines GL(m) to GL(m+3), thereby sequentially selecting a single horizontal line (a single line of the pixels Pix disposed in the matrix). Also, in the display device 1, the control device 3 illustrated in FIG. 4 supplies the image signals to the pixels Pix, which belong to the single horizontal line, via the signal lines SL(k) to SL(k+3), thereby displaying the single horizontal line one by one. When this display operation is carried out, the drive circuits DRVL and DRVR illustrated in FIG. 4 are configured to apply the drive signals to the drive electrodes TL(n) to TL(n+2) corresponding to the respective single horizontal lines.

In the display region 2 of the display device 1, in plan view, as illustrated in FIG. 6, the plurality of signal lines SL(k) to SL(k+3) and the plurality of scan lines GL(m) to GL(m+3) are disposed in the regions overlapped with a light-shielding film BM. Also, in the display region 2, the regions in which the light-shielding film BM is not disposed serve as openings OP. The light-shielding film BM is disposed in the boundaries of the sub-pixels SPix and therefore, has a lattice shape. The openings OP are the openings which are formed in the lattice shape of the light-shielding film BM and are disposed to correspond to the sub-pixels SPix. The opening of the red sub-pixel SPix is denoted by reference character OP(R), the opening of the green sub-pixel SPix is denoted by reference character OP(G), and the opening of the blue sub-pixel SPix is denoted by reference character OP(B).

Figure 7:
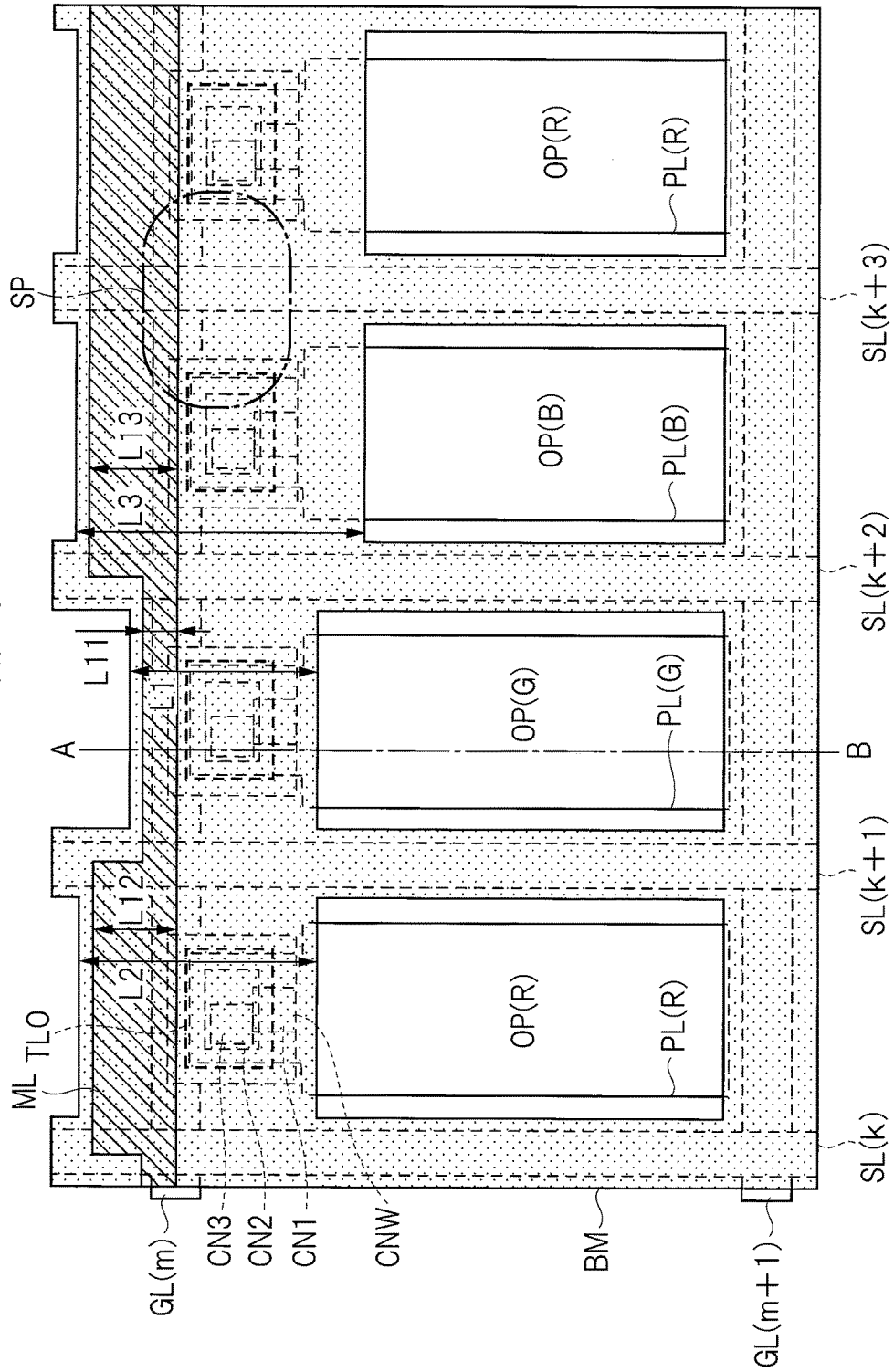
FIG. 7 is a plan view illustrating arrangement relation between a metal electrode opposed to a drive electrode and a light-shielding film according to the first embodiment.
Figure 8:
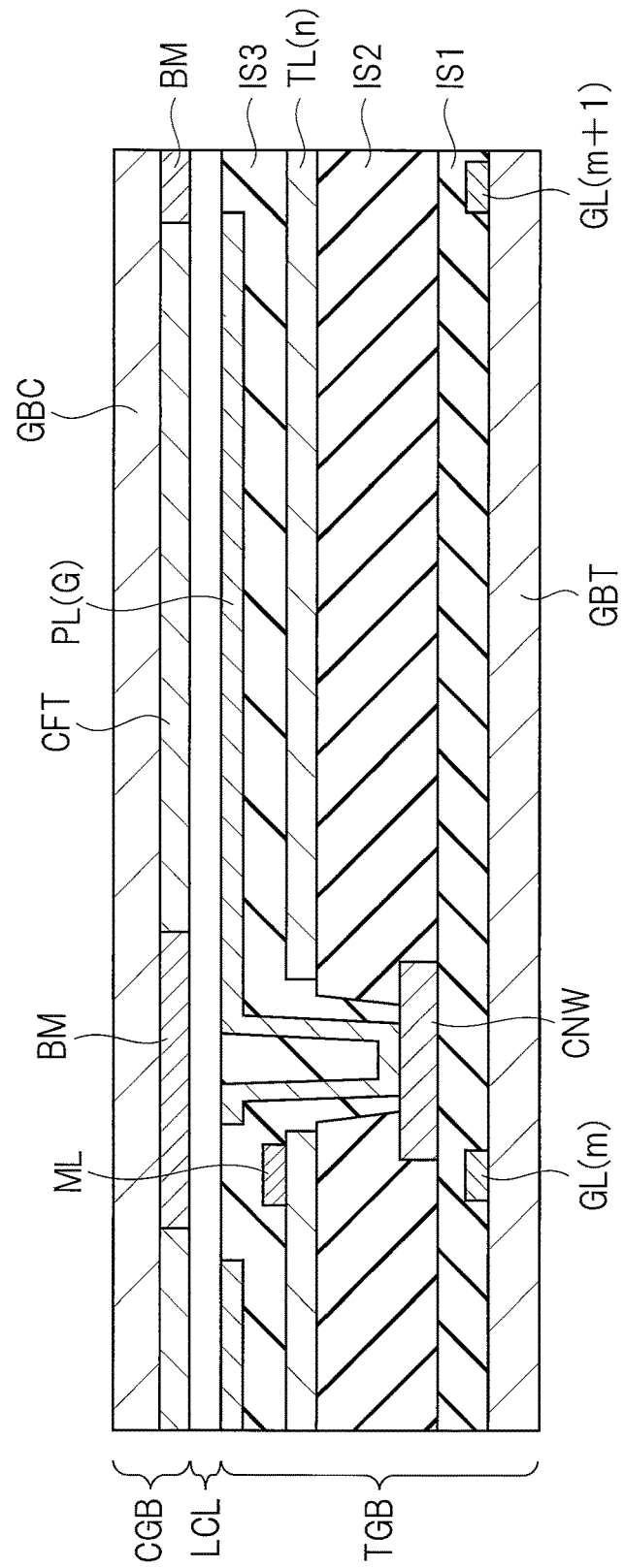
FIG. 8 is a cross-sectional view taken along a section line A-B of FIG. 7.
Figure 9:
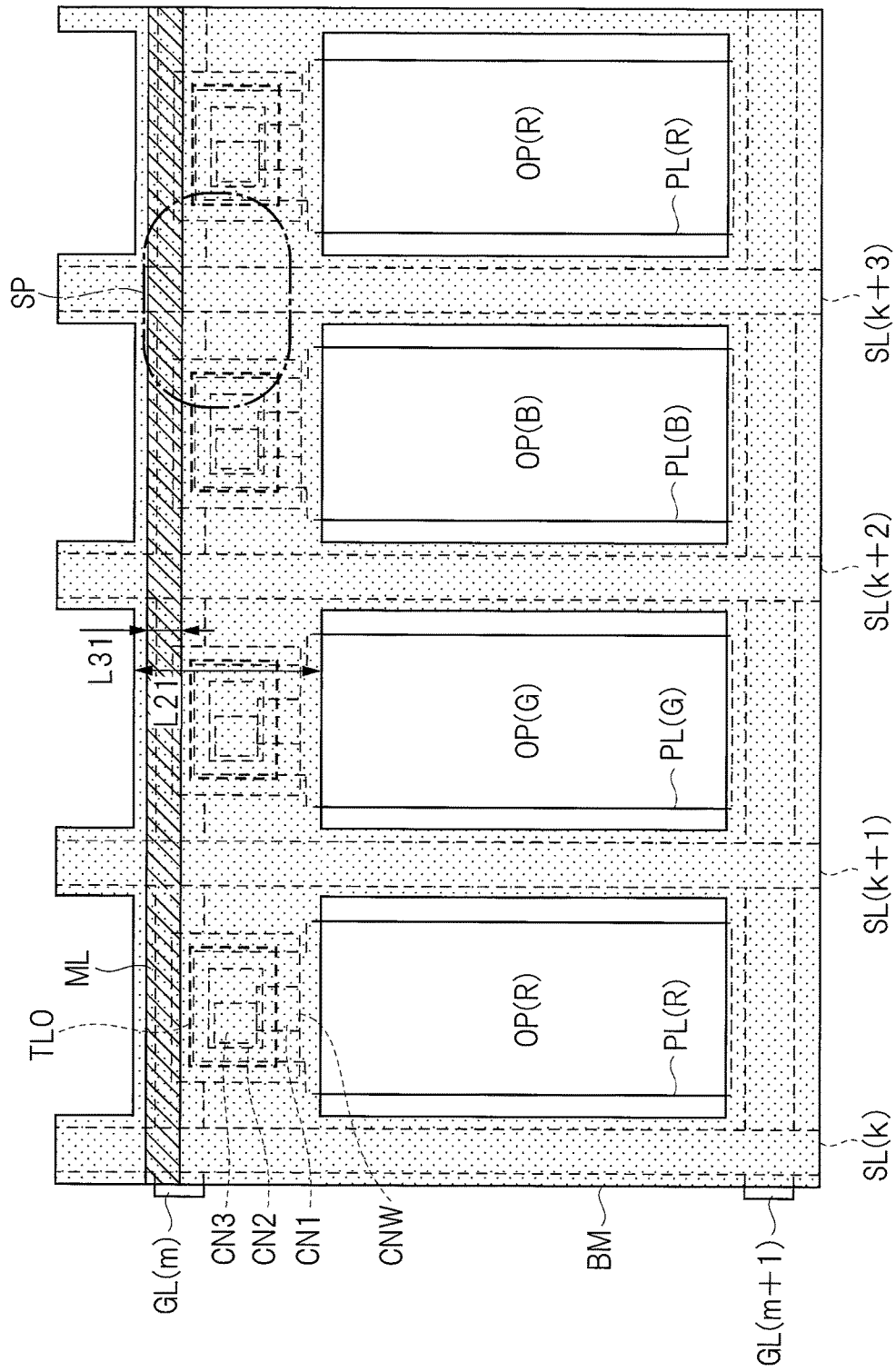
FIG. 9 is a plan view illustrating arrangement relation between a metal electrode opposed to a drive electrode and a light-shielding film according to a comparative example of the first embodiment.
Figure 16:
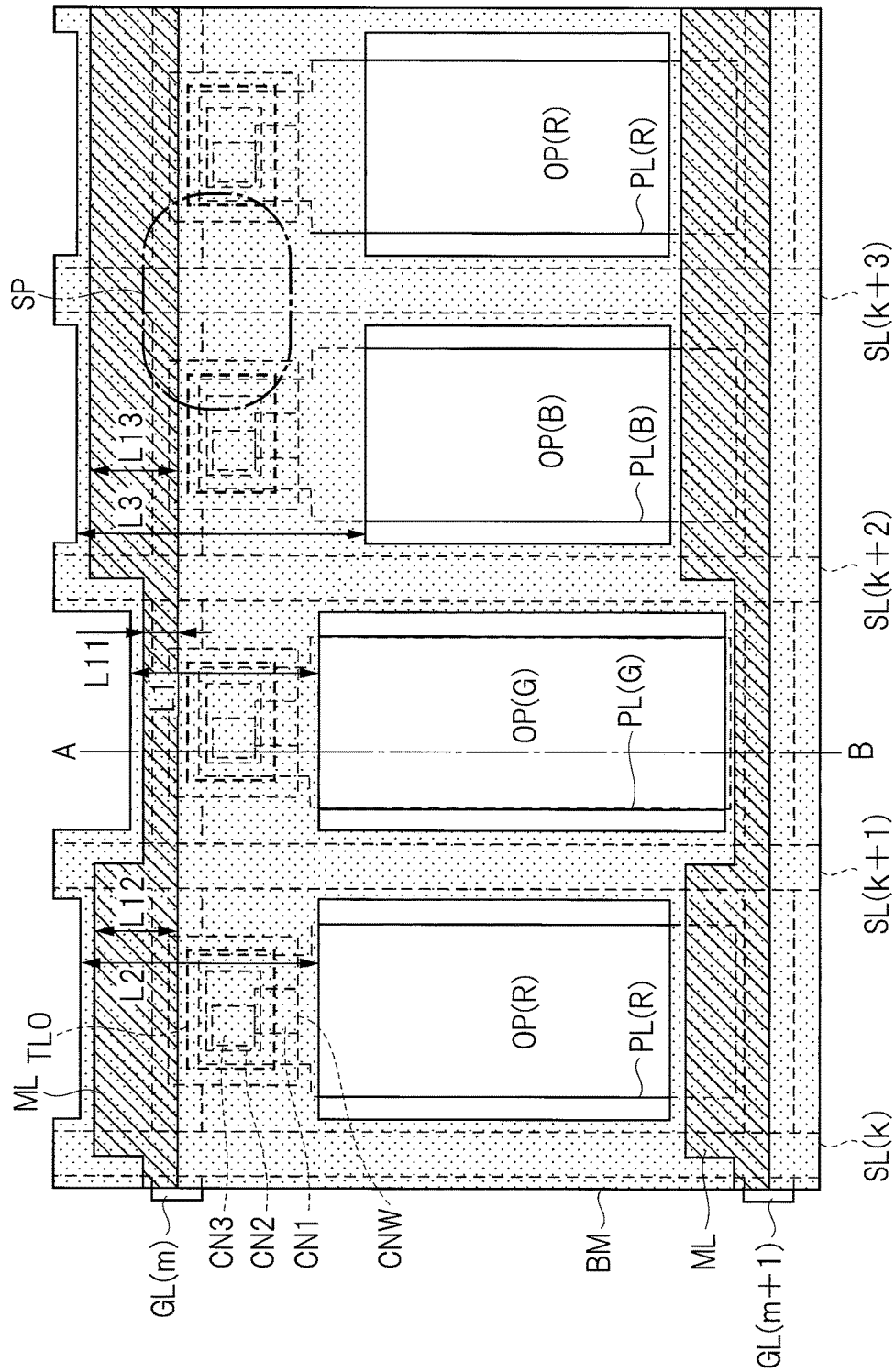
FIG. 16 is a plan view illustrating another example of the arrangement relation between the metal electrode opposed to the drive electrode and the light-shielding film according to the first embodiment.

Arrangement Relation Between Metal Electrode Opposed to Drive Electrode and Light-Shielding Film FIGS. 7 to 9 and FIG. 16 are views for describing arrangement relation between a metal electrode opposed to a drive electrode and a light-shielding film. Among these, FIG. 7, FIG. 8, and FIG. 16 are views describing the first embodiment, and FIG. 9 is a view describing the comparative example for the first embodiment.

In a case of a touch panel of the electromagnetic induction method like the display device 1 according to the first embodiment, in order to reduce the resistance value of the drive electrode and increase a current amount, it is effective to dispose a metal electrode opposed to the drive electrode. It is for a reason that the touch panel of the electromagnetic induction method requires resistance reduction more than a touch panel of the capacitive sensing method.

In this case, the region in which the metal electrode is disposed is limited to an inner side of the light-shielding film. Therefore, the first embodiment provides the display device having an input detection device which reduces the resistance of the drive electrode by the arrangement relation between the metal electrode and the light-shielding film.

First, in order to facilitate understanding of the characteristics of the arrangement relation between the metal electrode opposed to the drive electrode and the light-shielding film according to the first embodiment, the comparative example for the first embodiment will be described. FIG. 9 is a plan view illustrating the arrangement relation between a metal electrode opposed to drive electrodes and a light-shielding film according to the comparative example for the first embodiment. FIG. 9 is illustrated in plan view and illustrates part of four pixel arrays of a red pixel, a green pixel, a blue pixel, and a red pixel.

In the display device 1, there is a method in which a metal electrode ML is disposed to be opposed to the drive electrodes in order to reduce the resistance of the drive electrodes TL(0) to TL(p). In that case, in order to suppress reflection caused by a wiring layer of the metal electrode ML, the metal electrode ML has to be disposed so as to be included in the light-shielding film BM. In the example of FIG. 9, the metal electrode ML is formed in a linear shape along the scan line GL(m). More specifically, in the pixel array of the red pixels, green pixels, and blue pixels, the metal electrode ML is formed to have a width L31 having an equal width along the scan line GL(m). In this case, the light-shielding film BM with which the metal electrode ML is overlapped is formed along the scan line GL by a width L21, which is larger than that of the metal electrode ML.

In the comparative example for the first embodiment illustrated in FIG. 9, since the region in which the metal electrode ML is disposed is limited to the inner side of the light-shielding film BM, in consideration of the arrangement relation between the metal electrode ML and the light-shielding film BM, resistance reduction of the drive electrode TL is further required.

Therefore, in the first embodiment, arrangements as illustrated in FIG. 7 and FIG. 8 are made. FIG. 7 is a plan view illustrating the arrangement relation between a metal electrode opposed to the drive electrodes and the light-shielding film according to the first embodiment. FIG. 7 is illustrated in plan view and illustrates part of four pixel arrays of a red pixel, a green pixel, a blue pixel, and a red pixel. FIG. 8 is a cross-sectional view by a section line A-B of FIG. 7.

In FIG. 7 and FIG. 8, reference characters SL(k) to SL(k+3) denote the signal lines, reference characters GL(m) to GL(m+1) denote the scan lines, and reference character TL(n) denotes the drive electrode. An opening of the drive electrode TL(n) is denoted by reference character TLO. Also, reference character BM denotes the light-shielding film, and the openings of the light-shielding film BM are denoted by reference characters OP(R), OP(G), and OP(B). Reference characters (R), (G), and (B) of the openings OP correspond to the red pixel, the green pixel, and the blue pixel, respectively. Also, reference character ML denotes the metal electrode, reference character SP denotes a spacer, and reference characters PL(R), PL(G), and PL(B) denote pixel electrodes, respectively. Reference characters (R), (G), and (B) of the pixel electrodes PL correspond to the red pixel, the green pixel, and the blue pixel, respectively. Also, reference characters CN1 to CN3 denote contacts, reference character CNW denotes a contact wire, and reference characters IS1 to IS3 denote insulating layers, respectively. The contact CN1, the contact CN2, and the contact CN3 are the contacts through openings of the insulating layer IS1, the insulating layer IS2, and the insulating layer IS3, respectively, and the contacts CN2 and CN3 use the contact wire CNW as a bottom base.

As illustrated in FIG. 7 and FIG. 8, the display device 1 according to the first embodiment is provided with the first substrate (TFT substrate) TGB, the second substrate (CF substrate) CGB disposed to be opposed to the first substrate TGB, and the liquid crystal layer LCL sandwiched between the first substrate TGB and the second substrate CGB (as these substrates, glass substrates are adopted in the present embodiment, resin substrates may be applicable). A backlight (not illustrated) is disposed on a back surface of the first substrate TGB.

The second substrate CGB includes a glass substrate GBC and a color filter CFT formed over one surface of the glass substrate GBC. The color filter CFT has the light-shielding film BM having the lattice shape and the openings OP(R), OP(G), and OP(B). The light-shielding film BM is formed of a material having a high light absorption rate. In the color filter CFT, color regions colored by three colors, i.e., red, green, and blue are periodically arrayed in the openings OP(R), OP(G), and OP(B) and are associated with the pixels Pix using the three sub-pixels SPix illustrated in FIG. 6 as one set.

The first substrate TGB includes a glass substrate GBT, the plurality of pixel electrodes PL(R), PL(G), and PL(B) disposed in the lattice shape on the glass substrate GBT, the drive electrode TL(n), and the insulating layer IS3. On the drive electrode TL(n), the metal electrode ML is formed to be opposed thereto. The drive electrode TL(n) is formed of a transparent conductive material such as indium tin oxide (ITO). The metal electrode ML is formed of a metal material having a higher conductivity than that of the drive electrode TL(n), for example, a metal such as Ti (titanium) or AL (aluminum).

Wires of the signal lines which supply the pixel signals to the pixel electrodes PL(R), PL(G), and PL(B), the scan lines which drive the TFT elements, etc. are formed in the first substrate TGB in a layered manner. FIG. 8 illustrates the scan line GL(m). The pixel electrodes PL(R), PL(G), and PL(B) are connected to the contact wire CNW through the contacts CN3 and CN2 and are further connected to the signal lines through the contact CN1. The insulating layers IS1 and IS2 are formed between the TFT elements, the signal lines, and the scan lines excluding portions connected by the contacts CN1 and CN2. In other words, the TFT elements, the signal lines, and the scan lines are formed in different layers.

In the first embodiment, as illustrated in FIG. 7, the light-shielding film BM is disposed in a shape that includes the signal lines SL(k) to SL(k+3) and the scan line GL(m). It is for a reason to suppress reflection caused by the wiring layers of the signal lines SL(k) to SL(k+3) and the scan line GL(m). The shape of the light-shielding film BM in this case normally maximizes an aperture ratio with minimally required dimensions for preventing the reflection, and particularly, the aperture ratio of the green pixels having a high visibility is often maximized. Also in the first embodiment, the shape of the light-shielding film BM maximizes the aperture ratio of the green pixel. The larger the openings OP(R), OP(G), and OP(B), the larger the aperture ratios. In FIG. 7, the opening OP(G) is enlarged to maximize the aperture ratio of the green pixel. At this green pixel, a width L1 of the light-shielding film BM along the scan line GL(m) is made small.

Meanwhile, in order to optimize white balance, a method in which a width of the light-shielding film BM is made larger at the red pixels and the blue pixels than that at the green pixels to reduce the aperture ratios is used in some cases. Also in the first embodiment, at the red pixel or the blue pixel or at both of the pixels, the width of the light-shielding film BM is made larger than that at the green pixel to reduce the aperture ratio. In FIG. 7, at the red pixel on the left, a width L2 of the light-shielding film BM along the scan line GL(m) is made large.

It is required to dispose the spacer SP for retaining a gap between the first substrate TGB and the second substrate CGB. However, liquid crystal orientations are easily disturbed in the periphery thereof. Since it is required to shield the periphery thereof from light, the width of the light-shielding film BM is made larger, in some cases. Also in the first embodiment, the width of the light-shielding film BM is made larger at the pixels in the periphery of the spacer SP. In FIG. 7, at the red pixel and the blue pixel on the right, a width L3 of the light-shielding film BM along the scan line GL(m) is made large.

FIG. 16 is a plan view illustrating another example of the arrangement relation between the metal electrode opposed to the drive electrode and the light-shielding film according to the first embodiment. FIG. 16 illustrates the arrangement relation between the metal electrode and the light-shielding film in a case where the metal electrode ML is arranged also on a side of the scan line GL(m+1). As illustrated in FIG. 16, a shape of the light-shielding film BM on the side of the scan line GL(m+1) is the same as that on a side of the scan line GL(m). That is, on the side of the scan line GL(m+1), the light-shielding film BM at each of the red pixel on the left, the blue pixel, and the red pixel on the right is formed in a region closer to the side of the scan line GL(m) than the light-shielding film BM at the green pixel. Accordingly, also on the side of the scan line GL(m+1), a width of the light-shielding film BM at each of the red pixel on the left, the blue pixel, and the red pixel on the right is made larger than a width of the light-shielding film BM at the green pixel. In addition, the metal electrode ML on the side of the scan line GL(m+1) is also formed so as to overlap with the light-shielding film BM in plan view. As illustrated in FIG. 16, a width of the metal electrode ML at each of the red pixel on the left, the blue pixel, and the red pixel on the right where the width of the light-shielding film BM is large is larger than a width of the metal electrode ML at the green pixel. Note that the metal electrode ML on the side of the scan line GL(m+1) may not necessarily be arranged. In the first embodiment, at the location including a portion of the light-shielding film BM with a large width as described above, as illustrated in FIG. 7 and FIG. 16, a width of the wiring pattern of the metal electrode ML is also formed to be large. In FIG. 7, regarding the width of the light-shielding film BM along the scan line GL(m), the width L1 at the green pixel is the smallest, the width L2 at the red pixel on the left is made larger compared with that, and the width L3 at the red pixel and the blue pixel on the right is made much larger. Corresponding to this, regarding the width of the wiring pattern of the metal electrode ML, a width L11 at the green pixel is the smallest, a width L12 at the red pixel on the left is made larger compared with that, and a width L13 at the red pixel and the blue pixel on the right is made much larger. The width of the light-shielding film BM and the width of the wiring pattern of the metal electrode ML are the dimensions in the direction intersecting with the direction in which the scan line GL(m) extends.

In this manner, in the first embodiment, in plan view, the width of the wiring pattern of the metal electrode ML overlapped with the portion of the light-shielding film BM with the large width is larger than a width of the wiring pattern of the metal electrode ML overlapped with portions other than the portion of the light-shielding film BM with the large width. Specifically, the spacer SP is overlapped with the portion of the light-shielding film BM with the large width, and the width of the wiring pattern of the metal electrode ML overlapped with the spacer SP is larger than the width of the wiring pattern of the metal electrode ML not overlapped with the spacer SP. Also, the red pixel, the blue pixel, or both of the pixels are overlapped with the portion of the light-shielding film BM with the large width, and the width of the wiring pattern of the metal electrode ML overlapped with the red pixel, the blue pixel, or both of the pixels is larger than the width of the wiring pattern of the metal electrode ML not overlapped with the red pixel, the blue pixel, or both of the pixels. Therefore, in the present embodiment, the metal electrode ML has a step shape corresponding to the shape of the light-shielding film BM as illustrated in FIG. 7 and FIG. 16, instead of the simple linear shape like that of the comparative example illustrated in FIG. 9.

Therefore, according to the first embodiment, without reducing the aperture ratios, the total resistance value can be reduced more than the case in which the metal electrode is formed in the linear shape. More specifically, the resistance of the drive electrode can be reduced by the arrangement relation between the metal electrode ML and the light-shielding film BM. As a result, by applying this to a touch panel of the electromagnetic induction method, the time constant of the drive electrode can be reduced, and touch performance can be improved. Furthermore, even when this is applied to a touch panel which carries out detection by both of the methods, i.e., the electromagnetic induction method and the capacitive sensing method, touch performance with high accuracy can be obtained.

In the first embodiment, as illustrated in FIG. 8, the metal electrode ML is formed in a layer different from a layer in which the drive electrode TL(n) is formed. More specifically, the metal electrode ML is formed in an upper layer of the layer in which the drive electrode TL(n) is formed. The metal electrode ML and the drive electrode TL(n) are electrically connected to each other so as to make ohmic contact in a surface contact manner.

In the first embodiment, the electric connection between the metal electrode ML and the drive electrode TL(n) is not limited to the case in which they are in ohmic contact in a surface contact manner. For example, the metal electrode ML may be formed on the drive electrode TL(n) via an insulating layer, and the metal electrode ML and the drive electrode TL(n) may be electrically connected to each other through an opening of the insulating layer. In such a case, the metal electrode ML is insulated from the drive electrode TL(n), and the metal electrode ML and the drive electrode TL(n) are electrically connected to each other through the opening.

Second Embodiment

A display device 1 according to a second embodiment will be described with reference to FIGS. 10 to 14. In this second embodiment, difference from the first embodiment described before will be mainly described. The second embodiment is an example in which the idea of resistance reduction of the drive electrode in the first embodiment is applied also to arrangement of the far-end, the intermediate, and the near-end drive electrodes in the entire display region.

Operation in Magnetic Field Generation Period

Figure 10:
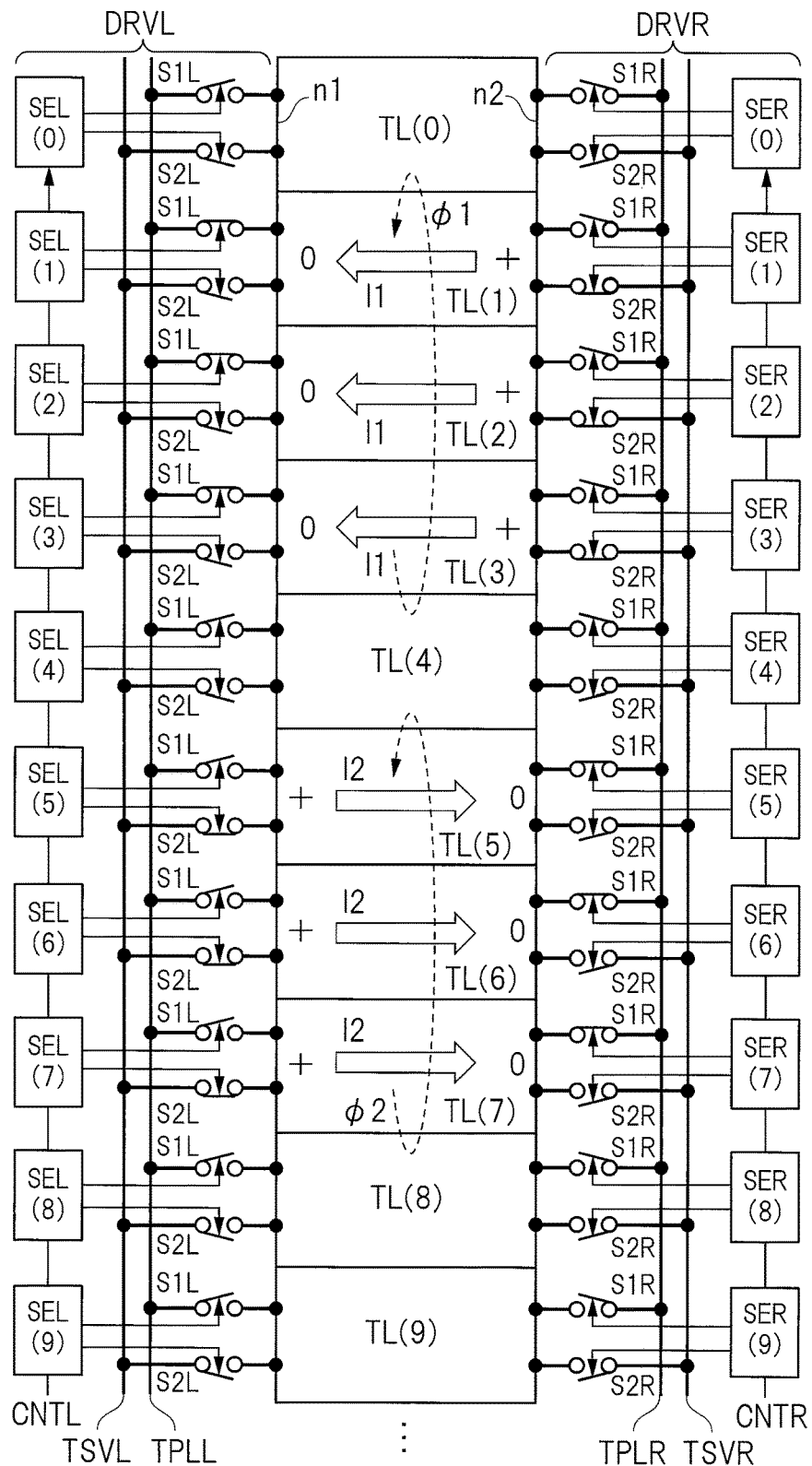
FIG. 10 is an explanatory plan view illustrating operation during a magnetic field generation period of a display device according to a second embodiment.

FIG. 10 is an explanatory plan view illustrating operation during a magnetic field generation period of the display device 1 according to the second embodiment. In FIGS. 2A to 2C described above, the principles of the magnetic field touch detection are illustrated by the example in which the loop-shaped magnetic field generation coil is formed by serially connecting the ends of the two drive electrodes separately disposed. However, in the present second embodiment, in magnetic field touch detection, a plurality of drive electrodes separately disposed are selected at the same time, and drive voltages are supplied thereto such that currents flow therethrough in mutually opposite directions.

In FIG. 10, reference characters TL(0) to TL(p) denote drive electrodes. The drive electrodes TL(0) to TL(p) are disposed in parallel to one another in plan view, and each of the drive electrodes is provided with a pair of ends n1 and n2.

In FIG. 10, reference characters DRVL and DRVR denote the drive circuits illustrated in FIG. 4. The drive circuits DRVL and DRVR are provided with selection circuits SEL(0) to SEL(p) and SER(0) to SER(p), respectively corresponding to the drive electrodes TL(0) to TL(p), and pairs of switches S1L and S2L and pairs of switches S1R and S2R, respectively, corresponding to these selection circuits.

Each of the selection circuits SEL(0) to SEL(p) and SER(0) to SER(p) switches the switches S1L and S2L or S1R and S2R corresponding to each selection circuit in accordance with a selection signal and selects any of the corresponding drive electrodes TL(0) to TL(p). Each of the switches S1L, S2L, S1R, and S2R corresponding to the selection circuits is caused to be in an on-state by the selection signal from the corresponding selection circuit.

When each of the switches S1L corresponding to the selection circuits SEL(0) to SEL(p) is caused to be in the on-state by the selection signal, the switch connects the signal wire TPLL with the one end n1 of any of the corresponding drive electrodes TL(0) to TL(p). When each of the switches S2L corresponding to the selection circuits SEL(0) to SEL(p) is caused to be in the on-state by the selection signal, the switch connects the signal wire TSVL with the one end n1 of any of the corresponding drive electrodes TL(0) to TL(p).

When each of the switches S1R corresponding to the selection circuits SER(0) to SER(p) is caused to be in the on-state by the selection signal, the switch connects the signal wire TPLR with the other end n2 of any of the corresponding drive electrodes TL(0) to TL(p). When each of the switches S2R corresponding to the selection circuits SER(0) to SER(p) is caused to be in the on-state by the selection signal, the switch connects the signal wire TSVR with the other end n2 of any of the corresponding drive electrodes TL(0) to TL(p).

In this second embodiment, the drive signal TPL supplied to the signal wires TPLL and TPLR is DC voltage. The DC voltage drive signal TPL is, for example, a signal of the voltage Vs like a ground voltage. the drive signal TSV supplied to the signal wires TSVL and TSVR is AC voltage. The AC voltage drive signal TSV is, for example, a signal which periodically changes between the voltage Vs such as the ground voltage and a voltage Vd higher than the voltage Vs.

Herein, a case in which a magnetic field is generated in the region of the drive electrode TL(4) will be described. In a magnetic field generation period, a plurality of drive electrodes and a plurality of other drive electrodes which are disposed to sandwich the region of the drive electrode at which the magnetic field is generated are selected, and the plurality of drive electrodes and the plurality of other drive electrodes are driven in such a way that the directions of the currents flowing through the plurality of drive electrodes and the plurality of other drive electrodes selected become opposite to each other.

In FIG. 10, the three adjacent drive electrodes are formed into a bundle, and a bundle of the drive electrodes (hereinafter, also referred to as a drive electrode bundle) are used as the drive electrodes forming a pair. More specifically, the drive electrodes TL(1) to TL(3) are formed into a bundle to constitute a drive electrode bundle, and the drive electrodes TL(5) to TL(7) are formed into a bundle to constitute a drive electrode bundle.

In the magnetic field generation period, the three drive electrodes TL(1) to TL(3) and the three drive electrodes TL(5) to TL(7), which are disposed so as to sandwich the drive electrode TL(4) corresponding to the region in which the magnetic field is generated, are selected by the corresponding selection circuits SEL(1) to SEL(3) and SER(1) to SER(3), and the corresponding selection circuits SEL(5) to SEL(7) and SER(5) to SER(7).

The selection circuits SER(1) to SER(3) turn on the switches S2R by the selection signals and connect the selected drive electrodes TL(1) to TL(3) to the signal wire TSVR. Similarly, the selection circuits SEL(1) to SEL(3) turn on the switches S1L by the selection signals and connect the selected drive electrodes TL(1) to TL(3) to the signal wire TPLL. At the selected drive electrodes TL(1) to TL(3), the voltage Vd is supplied to the other ends n2 from the signal wire TSVR, and the voltage Vs is supplied to the one ends n1 from the signal wire TPLL. In FIG. 10, the voltage Vd is indicated by +, and the voltage Vs is indicated by 0.

At the same time, the selection circuits SEL(5) to SEL(7) turn on the switches S2L by the selection signals and connect the selected drive electrodes TL(5) to TL(7) to the signal wire TSVL. Similarly, the selection circuits SER(5) to SER(7) turn on the switches S1R by the selection signals and connect the selected drive electrodes TL(5) to TL(7) to the signal wire TPLR. At the selected drive electrodes TL(5) to TL(7), the voltage Vd is supplied to the one ends n1 from the signal wire TSVL, and the voltage Vs is supplied to the other ends n2 from the signal wire TPLR.

As a result, currents I1 indicated by arrows flow in the drive electrodes TL(1) to TL(3) from the other ends n2 toward the one ends n1 thereof because of a voltage difference therebetween, and a magnetic field φ1 is generated. At the same time, currents I2 indicated by arrows flow in the drive electrodes TL(5) to TL(7) from the one ends n1 toward the other ends n2 thereof because of a voltage difference therebetween, and a magnetic field φ2 is generated. The magnetic field φ1 generated by the drive electrodes TL(1) to TL(3) and the magnetic field φ2 generated by the drive electrodes TL(5) to TL(7) are overlapped with each other in the region of the drive electrode TL(4), and a strong magnetic field can be generated in the region of the drive electrode TL(4).

In the same manner as in FIGS. 2A to 2C described above, electric charge is accumulated in the capacitive element of the pen Pen by the magnetic field generated in the magnetic field generation period, and the magnetic field generated by the pen Pen in the magnetic field detection period is detected by the magnetic field detection coil.

Metal Electrodes Opposed to Far-End and Near-End Drive Electrodes

Figure 11:
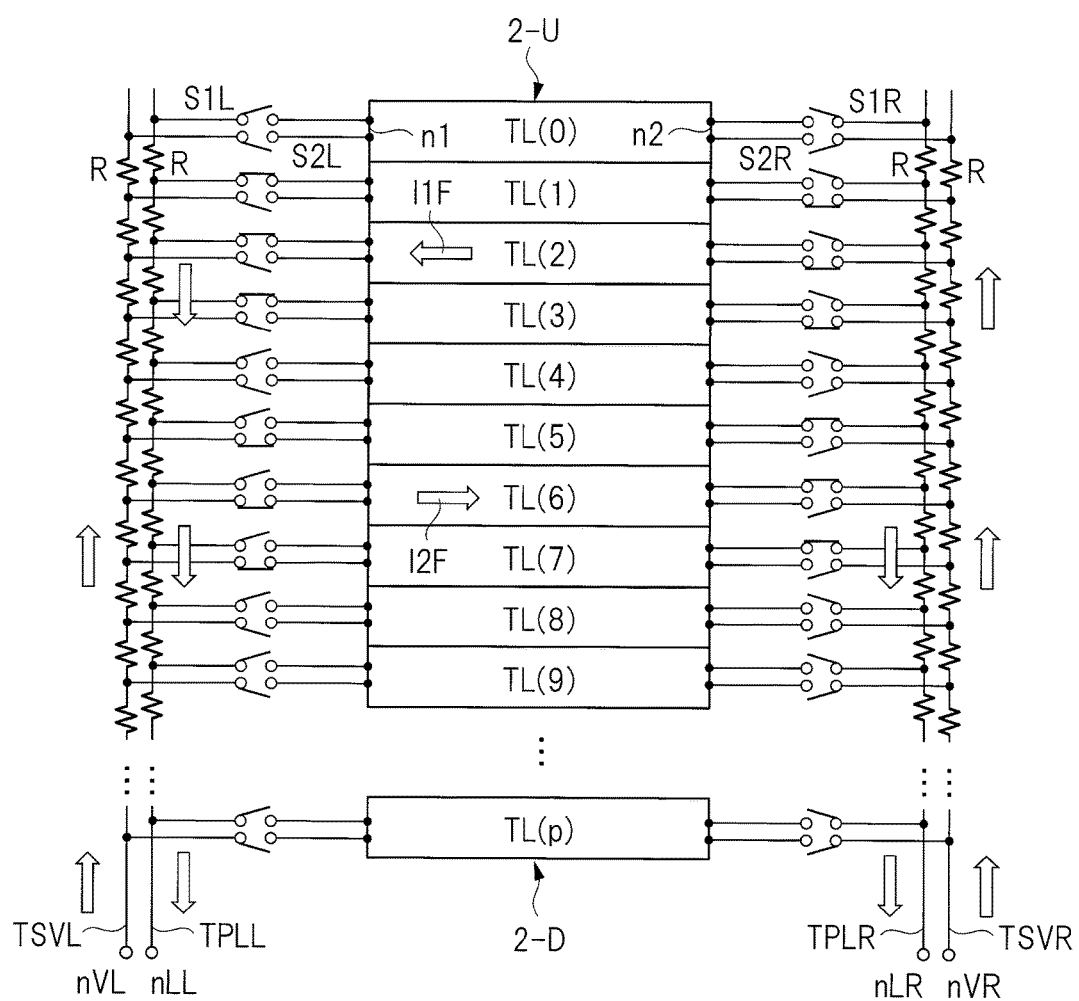
FIG. 11 is an explanatory view illustrating a problem of the display device according to the second embodiment.
Figure 12:
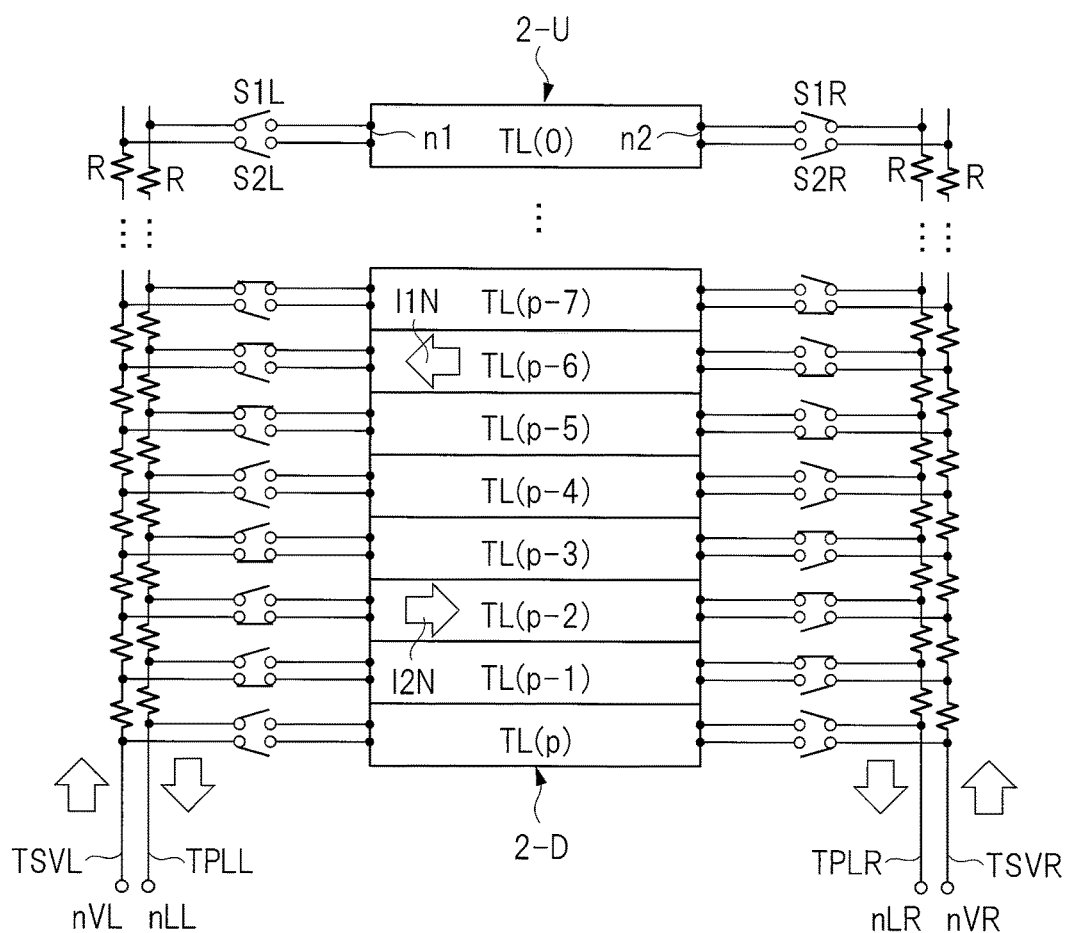
FIG. 12 is an explanatory view illustrating the problem of the display device according to the second embodiment.

FIGS. 11 and 12 are explanatory views illustrating a problem of the display device 1 according to the second embodiment. FIG. 11 is a plan view illustrating a configuration of the drive circuits and the far-end drive electrode, and FIG. 12 is a plan view illustrating a configuration of the drive circuits and the near-end drive electrode.

In FIG. 11 and FIG. 12, reference characters nVL and nVR denote respective ends of the signal wires TSVL and TSVR, and reference characters nLL and nLR denote respective ends of the signal wires TPLL and TPLR. The respective ends nVL, nVR, nLL, and nLR of the signal wires TSVL, TSVR, TPLL, and TPLR are connected to the control device 3, which is a supply source of the drive signals. In the magnetic field generation period, the control device 3 supplies the drive signals TSV having the voltage Vd to the end nVL of the signal wire TSVL and the end nVR of the signal wire TSVR and supplies the drive signals TPL having the voltage Vs to the end nLL of the signal wire TPLL and the end nLR of the signal wire TPLR.

FIG. 11 illustrates the state of the switches S1L, S1R, S2L, and S2R in a case in which a magnetic field is generated in the region of the drive electrode TL(4), which is close to the side 2-U of the display region 2. In contrast, FIG. 12 illustrates the state of the switches S1L, S1R, S2L, and S2R in a case in which a magnetic field is generated in the region of the drive electrode TL(p−4), which is close to the side 2-D of the display region 2.

In FIG. 11 and FIG. 12, reference character R illustrated on the signal wires TSVL, TSVR, TPLL, and TPLR denotes a resistance component accompanying the signal wire thereof as a resistance of a distribution constant.

As illustrated in FIG. 11, when a magnetic field is generated in the region of the drive electrode TL(4), the switches S1L and S2R connected to the respective ends n1 and n2 of each of the drive electrodes TL(1) to TL(3) become the on-state, and the switches S2L and the switches S1R connected to the respective ends n1 and n2 of each of the drive electrodes TL(5) to TL(7) become the on-state. As a result, currents I1F in the direction illustrated in the drive electrode TL(2) as an example flow in the drive electrodes TL(1) to TL(3), and currents I2F in the direction illustrated in the drive electrode TL(6) as an example flow in the drive electrodes TL(5) to TL(7), whereby the magnetic field is generated in the region of the drive electrode TL(4).

Similarly, as illustrated in FIG. 12, when a magnetic field is generated in the region of the drive electrode TL(p−4), the switches S1L and S2R connected to the respective ends n1 and n2 of the drive electrodes TL(p−7) to TL(p−5) become the on-state, and the switches S2L and S1R connected to the respective ends n1 and n2 of the drive electrodes TL(p−3) to TL(p−1) become the on-state. As a result, currents I1N in the direction illustrated in the drive electrode TL(p−6) as an example flow in the drive electrodes TL(p−7) to TL(p−5), and currents I2N in the direction illustrated in the drive electrode TL(p−2) as an example flow in the drive electrodes TL(p−3) to TL(p−1), whereby the magnetic field is generated in the region of the drive electrode TL(p−4).

In the case in which the magnetic field is generated in the region of the drive electrode TL(p−4), since the drive electrodes TL(p−7) to TL(p−5) and TL(p−3) to TL(p−1) are, in plan view, close to the respective ends nLL and nLR of the signal wires TPLL and TPLR to which the drive signals TPL are supplied and close to the respective ends nVL and nVR of the signal wires TSVL and TSVR to which the drive signals TSV are supplied, the resistances R connected between the respective ends n1 of these drive electrodes and the ends of the signal wires and between the respective ends n2 of these drive electrodes and the ends of the signal wires become low. Therefore, in FIG. 12, in the magnetic field generation period, the currents having an approximately same value as the currents flowing through the ends nLL, nLR, nVL, and nVR flow in these drive electrodes as the currents I1N and I2N.

In contrast, in the case in which the magnetic field is generated in the region of the drive electrode TL(4), since the drive electrodes TL(1) to TL(3) and TL(5) to TL(7) are distant from the ends nLL, nLR, nVL, and nVR of the signal wires in plan view, the resistances R connected between the respective ends n1 of the drive electrodes and the ends of the signal wires and between the respective ends n2 of the drive electrodes and the ends of the signal wires are increased. Therefore, in FIG. 11, in the magnetic field generation period, the currents having smaller values compared with FIG. 12 flow in these drive electrodes as the currents I1F and I2F.

Since the values of the currents which flow through the drive electrodes TL(1) to TL(3) and TL(5) to TL(7) are smaller than the values of the currents which flow through the drive electrodes TL(p−7) to TL(p−5) and TL(p−3) to TL(p−1), the magnetic fields generated by the drive electrodes TL(1) to TL(3) and TL(5) to TL(7) become weaker than the magnetic fields generated by the drive electrodes TL(p−7) to TL(p−5) and TL(p−3) to TL(p−1). As a result, the magnetic field generated in the region of the drive electrode TL(4) becomes weaker than the magnetic field generated in the region of the drive electrode TL(p−4). More specifically, the magnetic field generated by the drive electrodes which are disposed at the positions distant from the ends nLL, nLR, nVL, and nVR in plan view becomes weaker than the magnetic field generated by the drive electrodes which are disposed at the positions close to the ends nLL, nLR, nVL, and nVR.

Figure 13:
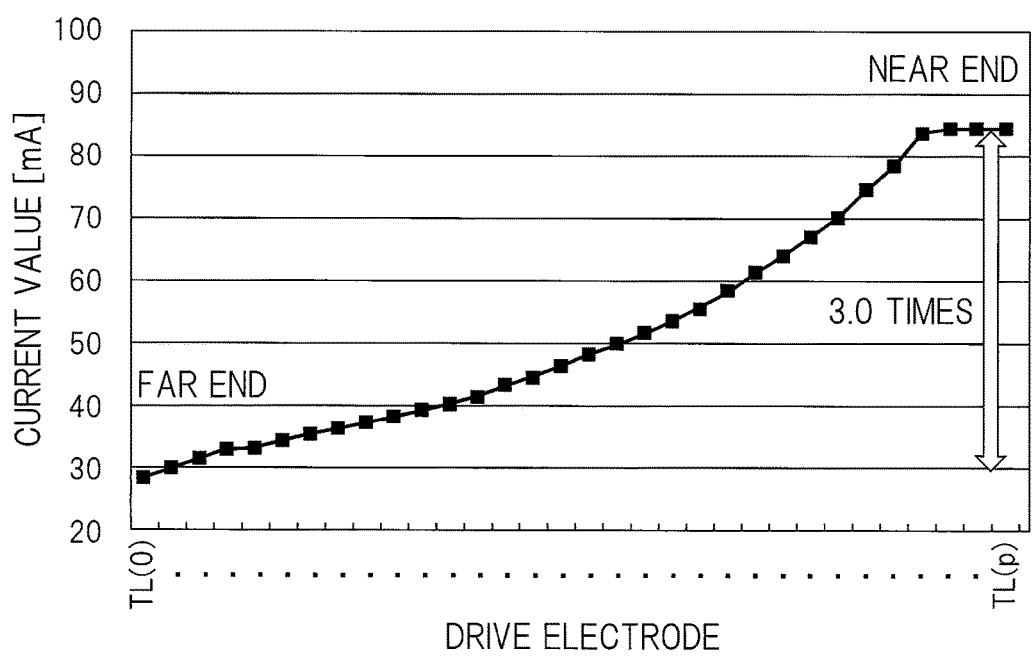
FIG. 13 is a characteristic diagram illustrating values of currents flowing through drive electrodes in each magnetic field generation period of FIG. 11 and FIG. 12.

FIG. 13 is a characteristic diagram illustrating values of currents flowing through drive electrodes in each magnetic field generation period of FIG. 11 and FIG. 12. FIG. 13 is a characteristic diagram measured and created by the present inventors. In FIG. 13, a horizontal axis represents the positions of the drive electrodes, a near end illustrates the drive electrode TL(p) disposed to be close to the ends nLL, nLR, nVL, and nVR to which the drive signals TPL and TSV are supplied, and a far end illustrates the drive electrode TL(0) disposed to be distant from the ends nLL, nLR, nVL, and nVR. The drive electrodes TL(p) to TL(0) are disposed in a direction away from the ends of the signal wire in this order. A vertical axis of FIG. 13 represents the values of the currents flowing through the drive electrodes. As is understood from FIG. 13, in the magnetic field generation period, the values of the currents which flow through the drive electrodes are smaller from the near end toward the far end. According to the results measured by the present inventors, the value of the current flowing through the drive electrode at the near end is about three times the value of the current flowing through the drive electrode at the far end.

When the values of the currents flowing through the drive electrodes are smaller from the near end toward the far end, the generated magnetic fields are also weakened from the near end toward the far end. Therefore, in the magnetic field generation period, the charge quantity accumulated in the capacitive element of the pen Pen is also different depending on the touched position. As a result, in the magnetic field detection period, the amount of change detected by the magnetic field detection coil is also changed, and the detection sensitivity is varied depending on the position. For example, it is conceivable to reduce the variations in the detection sensitivity and equalize them with respect to the positions by adjusting the received detection signals Rx(0) to Rx(p) by the touch control device 5 illustrated in FIG. 4. However, when the currents flowing through the drive electrodes are different from each other by three times as illustrated in FIG. 13, changes of the generated magnetic field are large, and it is not easy to carry out adjustment so as to equalize the detection sensitivity.

Figure 14:
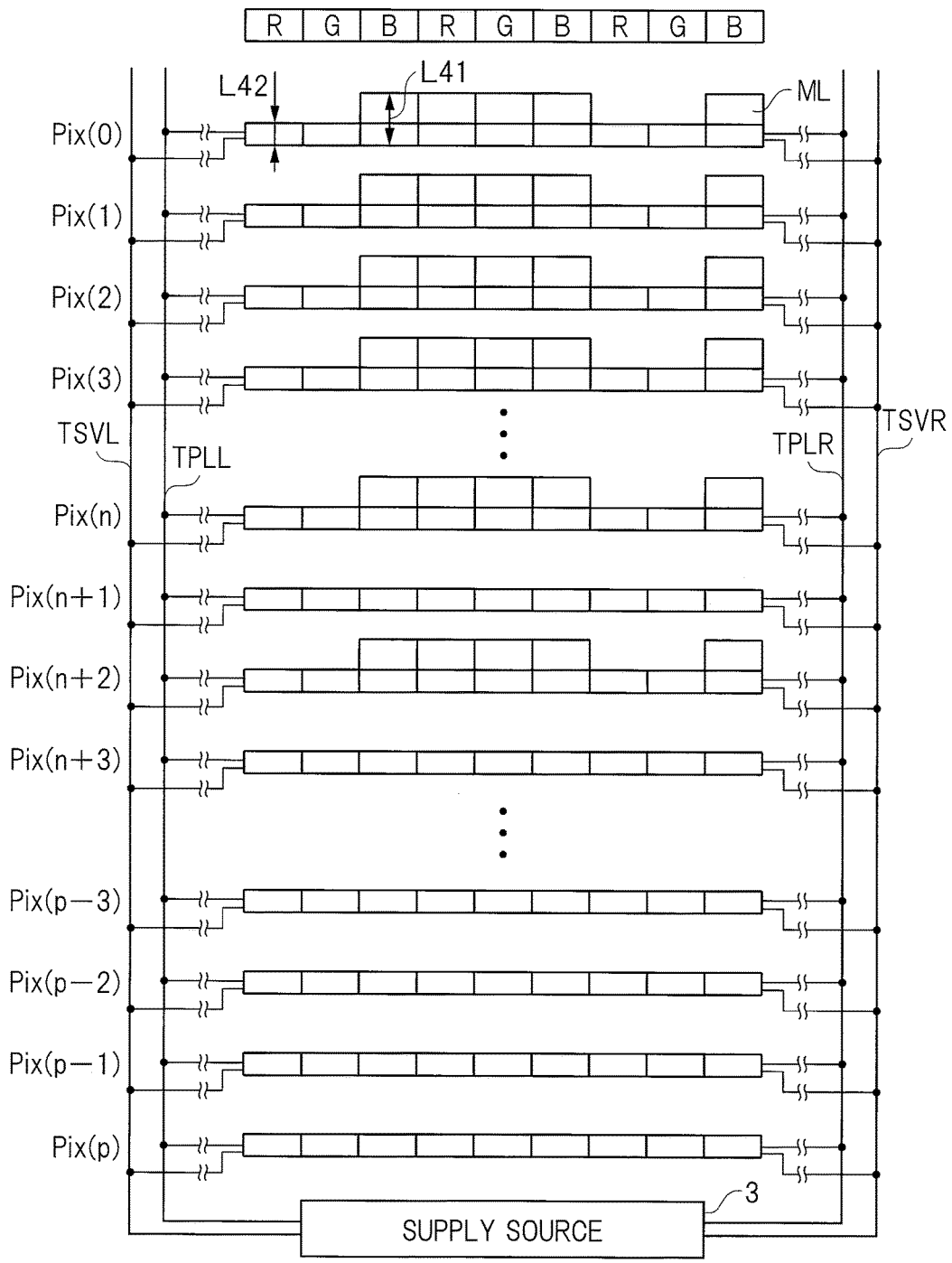
FIG. 14 is an explanatory diagram illustrating widths of metal electrodes opposed to far-end, intermediate, and near-end drive electrodes of the display device according to the second embodiment.

Therefore, in the second embodiment, the widths of the metal electrodes opposed to the drive electrodes have different widths at the far end and the near end. FIG. 14 is an explanatory diagram illustrating the widths of the metal electrodes opposed to the far-end, the intermediate, and the near-end drive electrodes of the display device 1 according to the second embodiment.

In FIG. 14, reference characters Pix(0) to Pix(3), Pix(n) to Pix(n+3), and Pix(p−3) to Pix(p) denote the rows of the pixel array in which the plurality of pixels are disposed in the matrix, and reference characters Pix(0) to Pix(3) denote the far end, reference characters Pix(n) to Pix(n+3) are the intermediate, and reference characters Pix(p−3) to Pix(p) denote the near end. "Pix(0)" is the farthest, and "Pix(p)" is the nearest. Reference characters R, G, and B denote that they correspond to the sub-pixels SPix of red, green, and blue, respectively. The pixels Pix of each row in the matrix are repeatedly disposed such that the three sub-pixels SPix of red, green, and blue correspond to one set of the pixel.

In FIG. 14, regarding the metal electrode ML opposed to each of the far-end drive electrodes, the intermediate drive electrodes, and the near-end drive electrodes, a portion (L41) where the width of the metal electrode ML is made large and a portion (L42) where the width of the metal electrode ML is made small are illustrated. The large portion (L41) is illustrated by two stacked rectangles, and the small portion (L42) is illustrated by a single rectangle.

For example, in the pixel array Pix(0) to Pix(3) at the far end, the widths of the metal electrodes ML corresponding to the pixels of red (R) and green (G) on the left end are formed to be small, the widths of the metal electrodes ML corresponding to the pixels of blue (B), red (R), green (G), and blue (B) adjacent thereto are formed to be large, the widths of the metal electrodes ML corresponding to the pixels of red (R) and green (G) adjacent thereto are formed to be small, and the width of the metal electrode ML corresponding to the pixel of blue (B) on the right end is formed to be large. In contrast, in the pixel array Pix(p−3) to Pix(p) at the near end, the widths of all the metal electrodes ML corresponding to the pixels of red (R), green (G), and blue (B) are formed to be small. Also, in the intermediate pixel array Pix(n) to Pix(n+3), the metal electrodes ML having the widths corresponding to the far end and the near end are formed alternately every other row.

In this manner, in the second embodiment, in plan view, the portion of the wiring pattern of the metal electrode ML whose width is large and opposed to the drive electrodes (corresponding to the pixel array Pix(p−3) to Pix(p)) positioned at the near end (first end) is getting smaller than the portion of the wiring pattern of the metal electrode ML whose width is large and opposed to the drive electrodes positioned (corresponding to the pixel array Pix(0) to Pix(3)) at the far end (second end), as the metal electrode is closer to the near end. By virtue of this, the closer to the near end from the far end the metal electrode is, the more the portion of the metal electrode ML whose width is large is reduced; as a result, in-plane difference in resistance between the drive electrodes can be suppressed. Since the density difference between the metal electrodes ML at the far end and the near end is not so large, line width variation due to etching variation can be also suppressed.

In the example of FIG. 14, two types, i.e., the portion (L41) of the metal electrode ML whose width is made large and the portion (L42) of the metal electrode ML whose width is made small are provided; however, the types can be broken down into three types or more. Regarding the widths of the far-end, the intermediate, and the near-end metal electrodes ML, it is desired that the widths of the metal electrodes ML be determined in consideration of the case in which the region where the width of the light-shielding film BM is large is small, such as a case in which disposition density of the spacers SP (FIG. 7) is low.

Electronic Device

Figure 15:
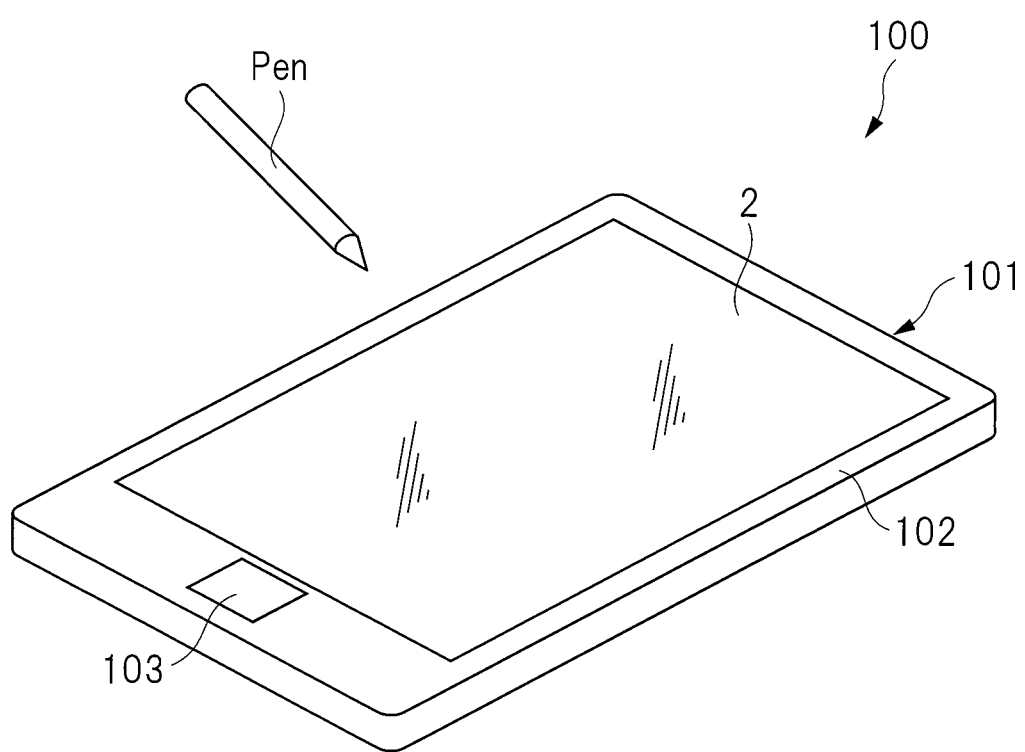
FIG. 15 is a perspective view illustrating an electronic device according to the first and the second embodiments.

FIG. 15 is a perspective view illustrating a configuration of an electronic device 100 with which the display device 1 described in the first and the second embodiments is provided. The electronic device 100 is provided with a tablet-type computer 101, which is provided with the display device 1, and the pen Pen. The pen Pen is an indicator including the coil and the capacitive element as illustrated in FIGS. 2A to 2C. In FIG. 15, reference numeral 2 denotes the above described display region, and reference numeral 102 denotes the frame region disposed so as to surround the display region 2. Also, reference numeral 103 denotes a button of the computer 101.

An image is displayed in the display region 2 in the above described display period. Also, in the magnetic field touch detection period, etc., whether the pen Pen is in proximity to the display region 2 or not and the coordinates thereof are detected, and the computer 101 carries out processing in accordance with the result of this detection.

The pen Pen and the tablet-type computer 101 may not be required to be electrically directly connected to each other. The electronic device 100 is not required to include the pen Pen, and, in that case, the tablet-type computer 101 itself corresponds to the electronic device 100. As a display device included in the electronic device 100, a laptop-type or a desktop-type personal computer can be used instead of the tablet-type computer.

Various modifications and alterations can be conceived by those skilled in the art within the spirit of the present invention, and it is understood that such modifications and alterations are also encompassed within the scope of the present invention.

For example, those skilled in the art can suitably modify the above-described embodiment by addition, deletion, or design change of components, or by addition, omission, or condition change of steps. Such modifications are also encompassed within the scope of the present invention as long as they include the gist of the present invention.

For example, in the above described embodiments, the case in which the drive electrodes TL(0) to TL(p) extend in the row direction (lateral direction) and are disposed in parallel in the column direction (longitudinal direction) has been described. However, the row direction and the column direction are changed depending on a viewpoint. A case in which, with a different viewpoint, the drive electrodes TL(0) to TL(p) extend in the column direction and are disposed in parallel in the row direction is also included in the scope of the present invention. Also, "parallel" used in the present specification means that they extend without intersecting with each other from one end to the other end. Therefore, even if a part or all of one line (or electrode) is provided in a tilted state with respect to the other line (or electrode), as long as these lines do not intersect with each other from one end to the other end, this state is also "parallel" in the present specification.

What is claimed is:

1. An input detection device comprising:
   a first substrate;
   a second substrate opposing the first substrate;
   a plurality of metal lines between the first substrate and the second substrate, the metal lines extending in a first direction; and
   a light-shielding film between the metal lines and the second substrate, a part of the light shielding film overlapping the metal lines, wherein
   the part of the light shielding film includes a first area having a predetermined width and a second area having a wider width than that of the first area, and
   at least one of the metal lines has a first portion corresponding to the first area and a second portion corresponding to the second area in one metal line, the second portion being wider than the first portion.

2. The input detection device according to claim 1, wherein
   at least one of the metal lines has at least one first portion and two second portions, the second portions projecting toward the same direction.

3. The input detection device according to claim 1, wherein
   the first portion and the second portion share a flat side of the metal line.

4. The input detection device according to claim 1, wherein
   the part of the light shielding film further includes a third area having a wider width than that of the second area, and
   the third area is overlapping another second portion of the metal line.

5. The input detection device according to claim 1, further comprising;
   a plurality of gate lines extending in the first direction,
   a plurality of signal lines extending in a second direction crossing the first direction, wherein
   each of the metal lines is overlapping the gate line.

6. The input detection device according to claim 5, further comprising;
   a plurality of pixel electrodes each receiving a pixel signal from thea corresponding signal line, each of the pixel electrodes being respectively provided in areas surrounded by the gate lines and the signal lines; and
   a plurality of common electrodes opposing to the pixel electrodes, the common electrodes extending in the first direction and respectively connected to the metal lines electrically.

7. The input detection device according to claim 1, further comprising;

a supply source supplying a signal to each of the metal lines, the supply source being adjacent to an outer most metal line of the metal lines, wherein a total length of the second portion of the metal line farther from the supply source is longer than that of the metal line closer to the supply source.

* * * * *